(12) United States Patent
Hasegawa et al.

(10) Patent No.: US 7,706,937 B2
(45) Date of Patent: Apr. 27, 2010

(54) MANAGEMENT SYSTEM FOR MOVING MACHINE

(75) Inventors: Satoshi Hasegawa, Tokyo (JP); Toyoichi Ono, Tokyo (JP); Hiroshi Inui, Tokyo (JP); Youichirou Kurihara, Tokyo (JP)

(73) Assignee: Komatsu Ltd., Tokyo (JP)

( * ) Notice: Subject to any disclaimer, the term of this patent is extended or adjusted under 35 U.S.C. 154(b) by 413 days.

(21) Appl. No.: 11/575,637

(22) PCT Filed: Sep. 16, 2005

(86) PCT No.: PCT/JP2005/017123

§ 371 (c)(1),
(2), (4) Date: Apr. 11, 2007

(87) PCT Pub. No.: WO2006/033293

PCT Pub. Date: Mar. 30, 2006

(65) Prior Publication Data

US 2008/0071470 A1 Mar. 20, 2008

(30) Foreign Application Priority Data

Sep. 21, 2004 (JP) .............................. 2004-273863

(51) Int. Cl.
*G01M 17/00* (2006.01)
*G06F 7/00* (2006.01)
(52) U.S. Cl. ............................ 701/29; 701/50; 701/207; 701/213; 340/825.49; 455/456.6
(58) Field of Classification Search ................. 340/991; 705/80
See application file for complete search history.

(56) References Cited

U.S. PATENT DOCUMENTS 5,945,919 A * 8/1999 Trask ..................... 340/825.49

(Continued)

FOREIGN PATENT DOCUMENTS

JP 7-203051 A 8/1995

(Continued)

OTHER PUBLICATIONS

Notification Concerning Transmittal of International Preliminary Report on Patentability, Chapter I of the Patent Cooperation Treaty for PCT/JP2005/017123, 5 Sheets.

(Continued)

*Primary Examiner*—Thomas G Black
*Assistant Examiner*—Lin B Olsen
(74) *Attorney, Agent, or Firm*—Frishauf, Holtz, Goodman & Chick, P.C.

(57) ABSTRACT

Information on current positions of a construction machine and a service car is transmitted from terminals of the construction machine and the service car, and the information is accumulated in a construction machine position information accumulation device and a service car position information accumulation device. A service car search device searches for a service car within a predetermined radius with the current position of a construction machine requiring maintenance as the center. Because the service car search device can detect a service car near the subject construction machine, the need of searching for the service car on a map is eliminated and the service car can be easily found. Thus, construction machines and service cars can be appropriately managed.

5 Claims, 17 Drawing Sheets

U.S. PATENT DOCUMENTS

| | | | |
|---|---|---|---|
| 6,292,724 B1 * | 9/2001 | Apsell et al. | 701/29 |
| 6,339,736 B1 * | 1/2002 | Moskowitz et al. | 701/29 |
| 6,651,001 B2 * | 11/2003 | Apsell | 701/213 |
| 7,278,567 B2 * | 10/2007 | Ferguson et al. | 235/375 |
| 2002/0052688 A1 * | 5/2002 | Yofu | 701/209 |
| 2003/0074134 A1 * | 4/2003 | Shike et al. | 701/207 |

FOREIGN PATENT DOCUMENTS

| | | | | |
|---|---|---|---|---|
| JP | 07203051 A | * | 8/1995 | |
| JP | 2001-84492 A | | 3/2001 | |
| JP | 2002-91547 A | | 3/2002 | |
| JP | 2002091547 A | * | 3/2002 | |
| JP | 2002-133588 A | | 5/2002 | |
| JP | 2002-150491 A | | 5/2002 | |
| JP | 2002133588 A | * | 5/2002 | |
| JP | 2003-030790 A | | 1/2003 | |
| JP | 2003030790 A | * | 1/2003 | |
| JP | 2003-288680 A | | 10/2003 | |
| JP | 2003288680 A | * | 10/2003 | |

OTHER PUBLICATIONS

Japanese Office Action (including English translation thereof) dated Nov. 11, 2008, issued in a counterpart Japanese Application.

* cited by examiner

825

| TERMINAL ID | MACHINE NUMBER | CURRENT POSITION INFORMATION |
|---|---|---|
| ST001 | 134567 | E1425396/N325806 |
| ST002 | 134568 | E1429581/N327415 |
| ST003 | 134569 | E1411056/N328059 |
| ... | ... | ... |

822

826

| TERMINAL ID | CARRIED TOOL | CARRIED COMPONENT | SERVICEMAN INFORMATION | PATROLLING PLAN INFORMATION |
|---|---|---|---|---|
| ST001 | WELDING MACHINE | OIL FILTER | ST001SERVICE.DB | ST001JUNKAI.DB |
| ST002 | NON | FUEL FILTER | ST002SERVICE.DB | ST002JUNKAI.DB |
| ... | ... | ... | ... | ... |

MANAGEMENT SYSTEM FOR MOVING MACHINE

This application is a U.S. National Phase Application under 35 USC 371 of International Application PCT/JP2005/017123 filed Sep. 16, 2005.

TECHNICAL FIELD

The present invention relates to a management system for moving machines that include construction machines and service cars performing maintenance on the construction machines.

BACKGROUND ART

As a management system for managing construction machines, there has been conventionally known a management system that acquires information about the construction machines from a terminal mounted on each construction machine through a communication line to manage the construction machines (see, for example, Patent Document 1). In the management system, the information of each construction machine such as current position, operation state and the like transmitted to a server from the terminal of the construction machine is accumulated in the server. When a user accesses the server from a user terminal through the communication line, the information of both the construction machines and the service cars accumulated in the server is displayed on a display screen of the user terminal. Displayed on a map on the display screen of the user terminal are, for example, the current positions of both the construction machines and the service cars, an owner and an operating area, operation state such as operation time, elements of the construction machine such as engine speed, fuel quantity and the like of a specified construction machine. Based on the displayed information, the user can manage the construction machines and, when a construction machine failure is reported, find a service car near the current position of the failed construction machine on the map.

[Patent Document 1] Japanese Patent Laid-Open Publication No. 2002-91574 (Pages 5 to 7, FIG. 1)

DISCLOSURE OF THE INVENTION

Problems to be Solved by the Invention

However, though the current positions of both the service cars and the construction machines can be displayed on the user terminal with such a management system, the position of the service car near the construction machine that requires maintenance has to be found from the displayed map, which is inconvenient. In particular, since there are many kinds of maintenance corresponding to many kinds of construction machines, it is difficult to find the service car capable of performing required maintenance from the map.

Further, if the construction machine has no terminal, since the current position, the operation state and the like of the construction machine can not be known by the management system and therefore can not be displayed on the display screen of the user terminal, such a construction machine can not be managed by the management system.

An object of the present invention is to provide a management system for moving machines that can properly manage moving machines including construction machines and service cars, and that can easily find a service car capable of performing required maintenance.

Means for Solving the Problems

A management system for moving machines according to an aspect of the present invention includes terminals mounted in the moving machines and a server connected with the terminals through a communication line to manage the moving machines, in which the moving machines include construction machines and service cars for performing maintenance on the construction machines, in which the server includes: a construction machine position information acquiring means that acquires current position information of the construction machines from the terminals of the construction machines; a construction machine detailed information accumulation means that accumulates detailed information of the construction machines; a service car position information acquiring means that acquires current position information of the service cars from the terminals of the service cars; and a service car search means that searches for the service car located within a predetermined range with a current position of a subject construction machine as reference based on the current position information of the construction machines acquired by the construction machine position information acquiring means and the current position information of the service cars acquired by the service car position information acquiring means, and in which the server transmits detailed information of the subject construction machine, among the detailed information accumulated in the construction machine detailed information acc means, to the service car searched out by the service car search means.

With such an arrangement, since the server has the service car search means, it is possible to search for the service car located within the predetermined range with the position of the subject construction machine that requires maintenance as reference. By properly setting the predetermined range preliminarily, the service car near the current position of the subject construction machine can be searched instantly, so that it not necessary for a user to search the service car near the subject construction machine while referring to a display screen. Accordingly, the work of referring to a map is omitted on the side of the user, and searching for the service car becomes easy. Thus, it is possible to properly and efficiently manage the moving machines.

Further, since the position information of both the construction machines and the service cars are acquired, by the construction machine position information acquiring means and the service car position information acquiring means, from the terminals of both the construction machines and the service cars through the communication line, the positions of the construction machines and the service cars can be known precisely. Thus, the precision of the service car search means is improved.

In aforesaid the management system for moving machines, it is preferred that the server includes a service car detailed information accumulation means that accumulates detailed information of the service cars, and the service car search means includes: a condition acquiring means that acquires detailed condition necessary for performing maintenance on the subject construction machine; and a narrowing-down means that selects, among the service cars located within the predetermined range with the current position of the subject construction machine as reference, the service car matched to the detailed condition acquired by the condition acquiring means based on the detailed information accumulated in the service car detailed information accumulation means.

With such an arrangement, since server has the narrowing-down means, the narrowing-down means can select, based on the detailed information accumulated in the service car detailed information accumulation means, the service car matched to the detailed conditions among the service cars searched out by the service car search means. Accordingly, not only the service car within the predetermined range from the current position of the subject construction machine can be searched, but also the service car capable of performing required maintenance on the subject construction machine can be searched. Thus, the service car can be searched more exactly, so that it is possible to provide maintenance more quickly. In particular, since there are many kinds of construction machines and therefore there will be many kinds of maintenance, the present invention is particularly useful in the case where the service cars capable of performing some special maintenance are limited.

Herein, examples of the detailed information include information on devices carried by the service car such as a welding machine, information on supplementary parts and replacement parts carried by the service car, and skill information of the serviceman of the service car.

In aforesaid the management system for moving machines, it is preferred that the service car search means includes a re-search means that enlarges the predetermined range and performs a re-search when no service car is matched to the detailed condition.

With such an arrangement, since the server has the re-search means, when there is no service car matched to the detailed information within the predetermined range, it is possible to perform the re-search within a further wider range. Thus, the service car matched to the detailed information can be searched more reliably. Particularly, when the subject construction machine requires a certain kind of maintenance such as wielding for a failure the construction machine, only the service car capable of performing the required maintenance needs to be searched. In such a case, the re-search means enlarges the predetermined range and re-searches the service car matched to the detailed search conditions, and the condition of being matched to the detailed search conditions has higher priority than the condition of being located within the initially set predetermined range. Thus, the search can be performed more exactly and flexibly.

A management system for moving machines according to another aspect of the present invention includes a server that manages the moving machines through a communication line, in which the moving machines include construction machines having no terminal and service cars for performing maintenance on the construction machines, the service cars each having a terminal, and in which the server includes: a tentative position information accumulation means that accumulates position information of the construction machines as tentative position information of the construction machines, the position information of the construction machines being acquired either through the communication line or through an input operation means of the server; a terminal-non-equipped vehicle detailed information accumulation means that accumulates detailed information of the construction machines acquired either through the communication line or through the input operation means; a service car position information acquiring means that acquires current position information of the service cars from the terminals of the service cars; and a service car search means that searches for the service car located within a predetermined range with a tentative current position of a subject construction machine as reference based on the tentative position information of the construction machines accumulated in the tentative position information accumulation means and the current position information of the service cars acquired by the service car position information acquiring means, and in which the server transmits detailed information of the subject construction machine, among the detailed information accumulated in the terminal-non-equipped vehicle detailed information accumulation means, to the service car searched out by the service car search means.

With such an arrangement, since the server has the tentative position information accumulation means, it is possible to accumulate the position information of the construction machine having no terminal as the tentative position information. Thus, it is possible to perform management even on the construction machine having no terminal through the communication line. For example, it is possible to search for the service car within the predetermined range with the current position of the subject construction machine as reference.

Herein, the methods for acquiring the tentative position information include, for example, transmitting the tentative position information from the terminal of the service car to the server through the communication line, directly transmitting the tentative position information to the server from an input operation means such as a keyboard and the like.

In aforesaid the management system for moving machines, it is preferred that the server includes a tentative position information updating means that acquires the tentative position information and updates information in the tentative position information accumulation means with the acquired tentative position information.

With such an arrangement, since the server has the tentative position information updating means, the information of the tentative position information accumulation means is updated every time the tentative position information of the subject construction machine is acquired. Since there is no terminal in the construction machine, the position information accumulated in the server may not refer to the current position of the construction machine due to the movement of the construction machine. However, due to the provision of the tentative position information updating means of the present invention, the tentative position information of the construction machine is constantly new. Thus, precise management can be performed even on the construction machine having no terminal.

In aforesaid the management system for moving machines, it is preferred that the tentative position information is acquired from the terminal of the service car, and the server recognizes a current position of the service car transmitted from the terminal of the service car as the tentative position information of the construction machine.

With such an arrangement, since the current position of the service car is recognized as the tentative position information of the construction machine having no terminal, when the tentative position information of the construction machine is transmitted from the terminal of the service car, the server recognizes the current position of the service car as the position information of the construction machine. Thus, the work for inputting the position information of the construction machine from the server through the input operation means or the like is omitted.

EXPLANATION OF CODES

1 . . . construction machine (moving machine), 1A . . . terminal-non-equipped vehicle (construction machine, moving machine), 2 . . . service car (moving machine), 7 . . . network (communication line), 8 . . . server, 18, 28 . . . terminal, 85 . . . service car search means, 88 . . . construction machine search means, 100 . . . management system, 823 . . . construction machine position information accumulation means, 824 . . . construction machine detailed information accumulation means, 825 . . . service car position information accumulation means, 826 . . . service car detailed information accumulation means, 828 . . . tentative position information accumulation means, 843 . . . construction machine position information acquiring means, 844 . . . construction machine detailed information acquiring means, 845 . . . service car position information acquiring means, 846 . . . service car detailed information acquiring means, 848 . . . tentative position information acquiring means (tentative position information updating means), 851 . . . condition acquiring means, 852 . . . narrowing-down means, 853 . . . re-search means

BEST MODE FOR CARRYING OUT THE INVENTION

Embodiments of the present invention will be described below with reference to the attached drawings. Incidentally, in the below-mentioned second embodiment, like components or components having like functions are denoted by like numerals as of the first embodiment and the explanation thereof will either be omitted or briefed.

FIRST EMBODIMENT

Figure 1:
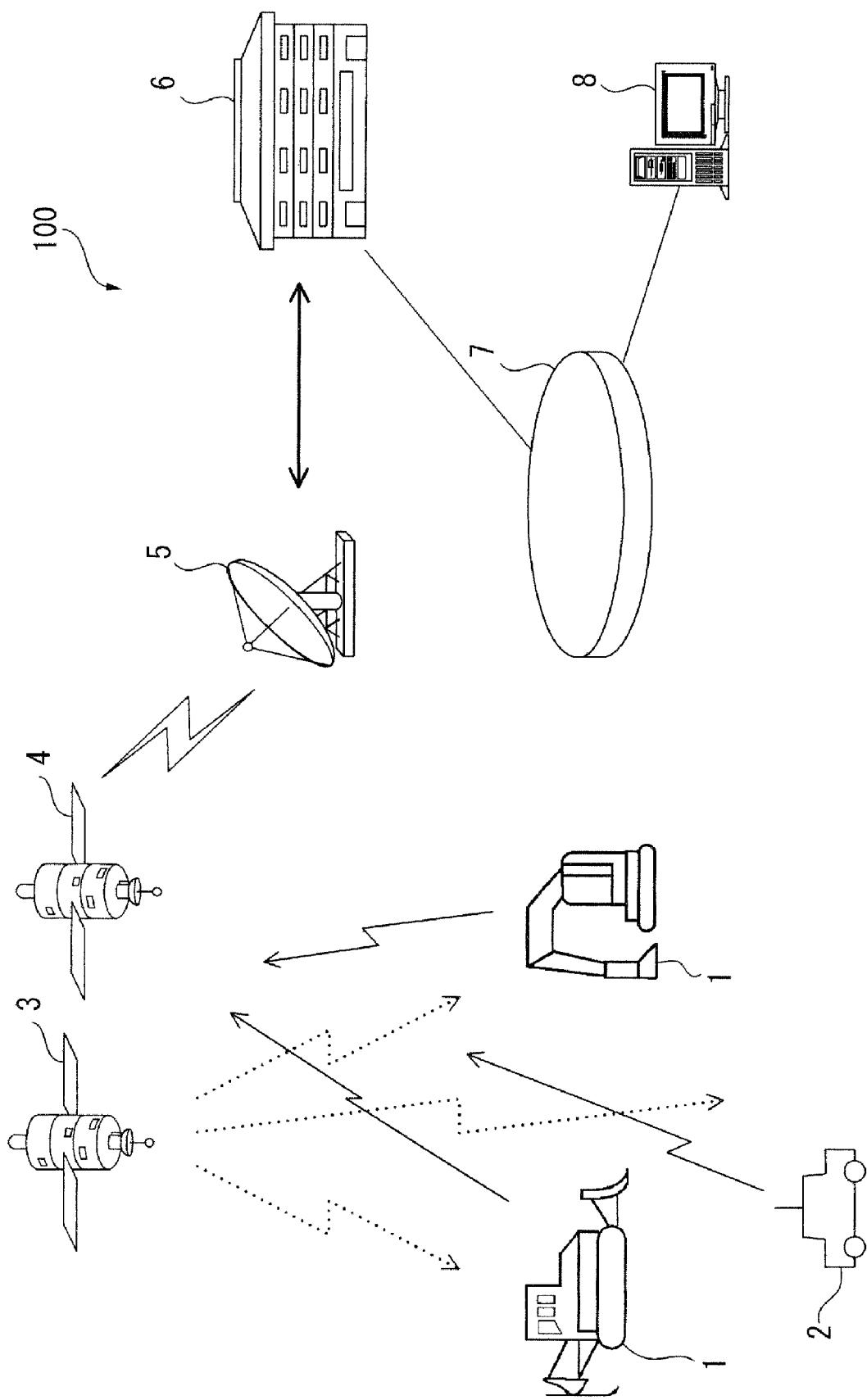
FIG. 1 is a schematic illustration showing a configuration of a management system for moving machines according to a first embodiment of the present invention.

FIG. 1 schematically illustrates a brief configuration of a management system 100 for moving machine according to a first embodiment of the present invention. The management system 100 includes construction machines (moving machines) 1, service cars (moving machines) 2 for performing maintenance on the construction machines 1, GPS (Global Positioning System) satellites 3, a communication satellite 4, a satellite earth station 5, a network control station 6, a network (communication line) 7, and a server 8. The management system 100 acquires, by the server 8, current position information, operation information and the like of both the construction machines and the service cars output by both the construction machines and the service cars, manages, by the server 8, the information of both the construction machines and the service cars managed by the server 8, and provides the information to customers according to necessity.

The construction machines 1 are machines for performing excavating work, leveling work and the like at a construction site of a road and the like. Examples of the construction machines 1 include a bulldozer, a hydraulic excavator and the like.

Figure 2:
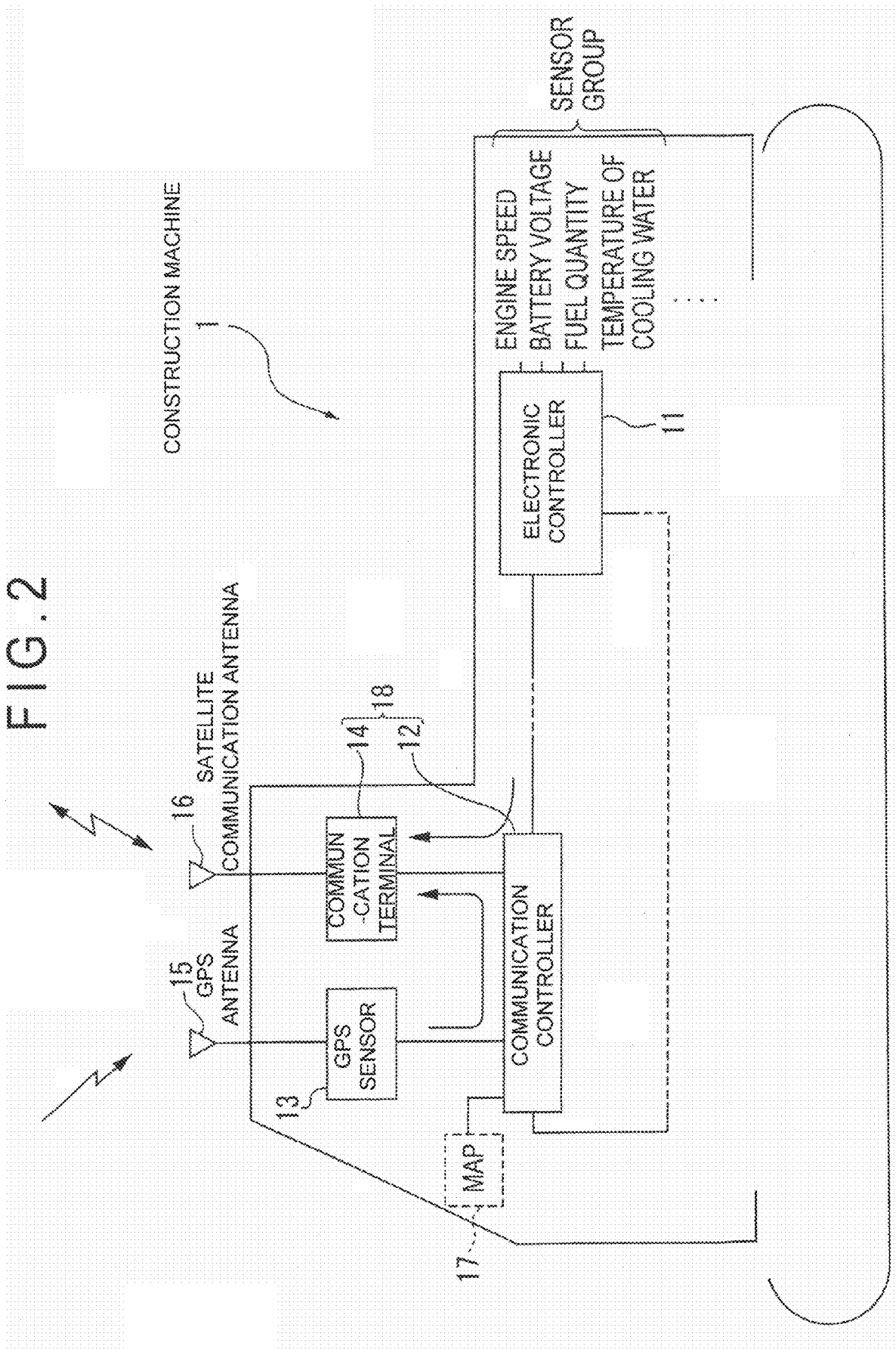
FIG. 2 is a schematic illustration showing a configuration of a construction machine and a terminal thereof according to the first embodiment of the present invention.

As shown in FIG. 2, each construction machine 1 includes an electronic controller 11 for electronically controlling a driving portion, a communication controller 12 connected with the electronic controller 11, a GPS sensor 13 and a communication terminal 14 both connected with the communication controller 12, a GPS antenna 15 connected with the GPS sensor 13, and a satellite communication antenna 16 connected with the communication terminal 14.

The electronic controller 11 receives signals from a sensor that detects states of elements for driving the construction machine 1, and electronically controls the elements. The elements for driving the construction machine 1 include engine speed, battery voltage, remaining fuel information, temperature of cooling water, a service meter, operating time and the like.

The communication controller 12 acquires machine information of the construction machine 1 based on the state of the driving portion of the construction machine 1 detected by the electronic controller 11. Specifically, the communication controller 12 can acquire the remaining fuel information, operation information and the like. Further, the communication controller 12 has a storage area inside. The storage area stores information such as an owner of the construction machine 1, a machine number of the construction machine 1, a total operating time and the like.

The GPS sensor 13 receives radio waves from a plurality of GPS satellites 3 through the GPS antenna 15, and measures its own position based on the received radio waves. The current position information of the construction machine 1 acquired by the GPS sensor 13 is output to the communication controller 12. By being combined with a map database, the current position information acquired by the GPS sensor 13 can be map-displayed on an image display 17 of a navigation system or the like.

The current position information, the operation information and the like of the construction machine 1 acquired by the communication controller 12 are output from the satellite communication antenna 16 through the communication terminal 14, and output to the server 8 through the communication satellite 4, the satellite earth station 5, the network control station 6 and the network 7.

Incidentally, a terminal 18 of the construction machine 1 is formed by the communication controller 12 and the communication terminal 14.

Figure 3:
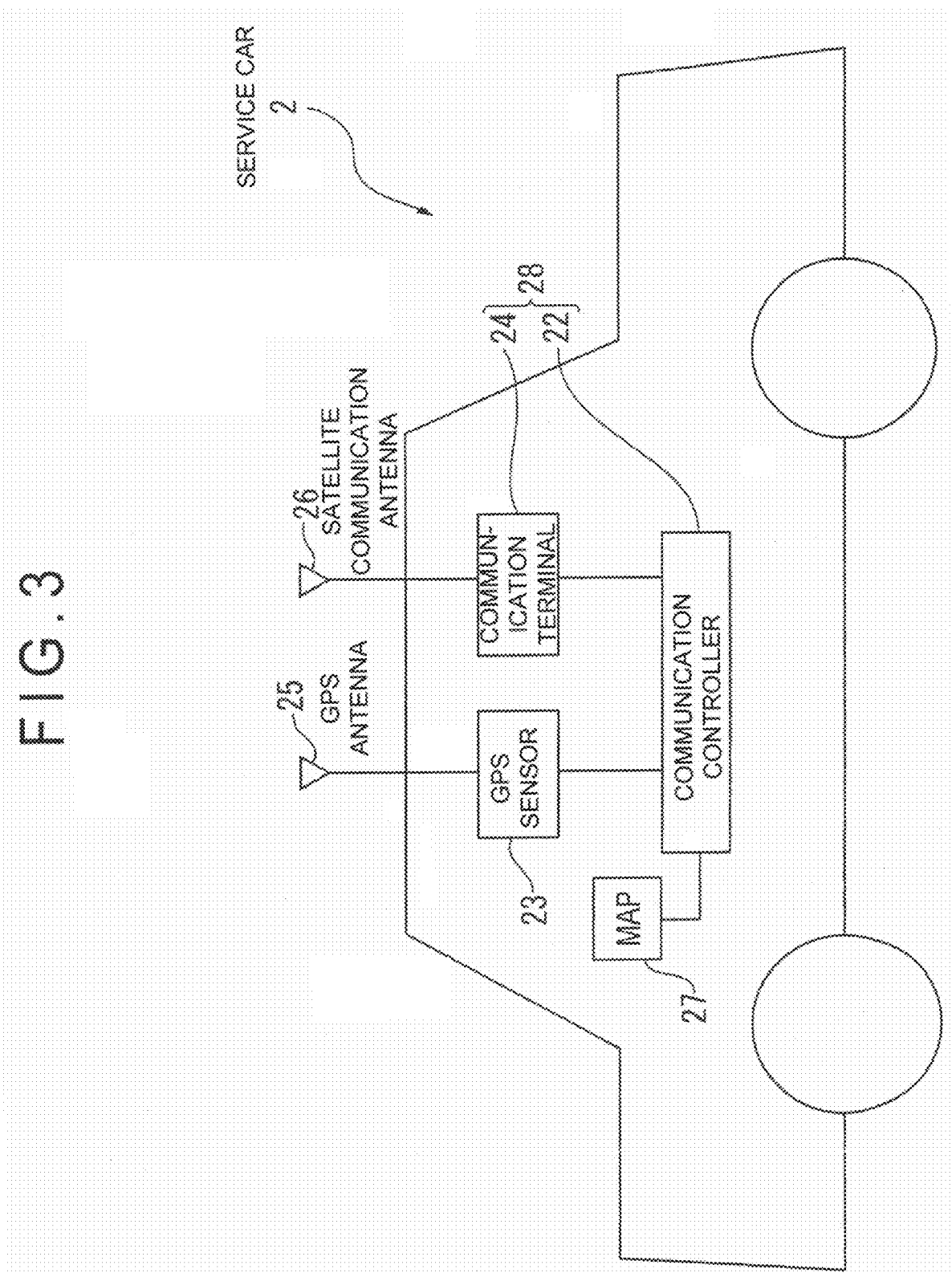
FIG. 3 is a schematic illustration showing a configuration of a service car and a terminal thereof according to the first embodiment of the present invention.

The service cars 2 are moving machines for performing maintenance on the construction machines 1. As shown in FIG. 3, each service car 2 includes a communication controller 22, a GPS sensor 23, a communication terminal 24, a GPS antenna 25 and a satellite communication antenna 26, each having similar configuration as that of the construction machine 1. By being combined with the map database, the current position information of the service car 2 acquired by the GPS sensor 23 can be displayed on an image display 27 of the navigation system or the like. The GPS sensor 23 measures the current position of the service car 2 based on the radio waves received through the GPS antenna 25. The current position information of the service car 2 output from the GPS sensor 23 is acquired by the communication controller 22 and output from the satellite communication antenna 26 through the communication terminal 24. Further, the current position information of the service car 2 is output to the server 8 through the communication satellite 4, the satellite earth station 5, the network control station 6 and the network 7. Incidentally, a terminal 28 of the service car 2 is formed by the communication controller 22 and the communication terminal 24.

The network 7 is the Internet based on a general-purpose protocol such as TCP/IP. The network control station 6 and the server 8 are connected by the network 7.

Figure 4:
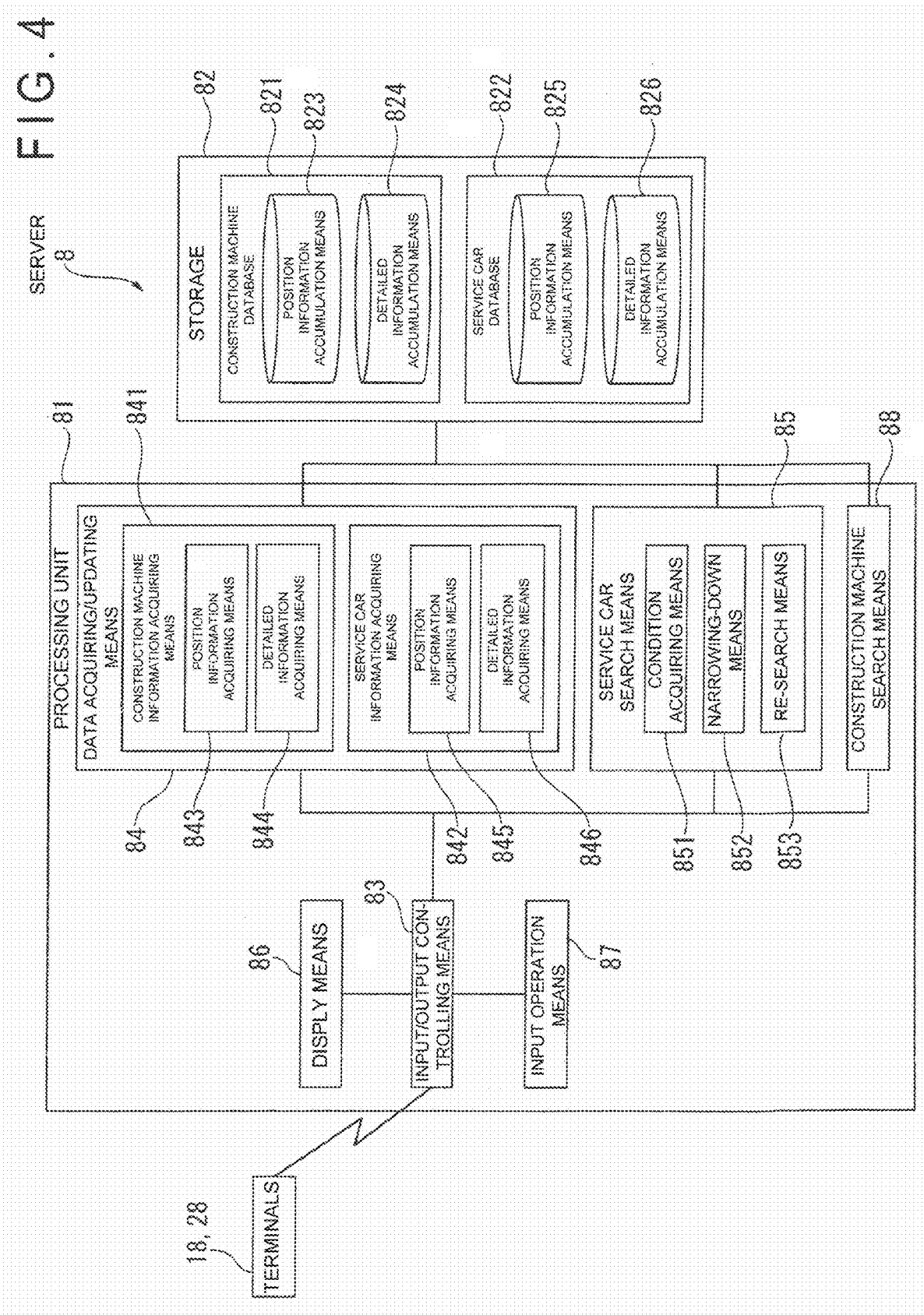
FIG. 4 is a schematic illustration showing a configuration of a server according to the first embodiment of the present invention.

The server 8 is a WWW (World Wide Web) server connected by the network 7. As shown in FIG. 4, the server 8 includes a processing unit 81 for processing various programs and a storage 82, such as a hard disc, for storing transmitted/received information. The processing unit 81 includes an input/output controlling means 83 for controlling data inputting into/outputting from the processing unit 81; a data acquiring/updating means 84, a service car search means 85 and a construction machine search means 88, each being a program developed on a database managing system operated on the processing unit 81; a display means 86 such as a display for displaying the information acquired by the processing unit 81; and an input operation means 87 such as a keyboard, a mouse or the like for inputting the information into the processing unit 81.

Further, a database for performing operation management on the construction machines 1 and the service cars 2 is provided inside the storage 82, the database including a construction machine DB 821 for accumulating the information of the construction machines 1 and a service car DB 822 for accumulating the information of the service cars 2.

The input/output controlling means 83 controls the information input/output through the network 7. More specifically, the input/output controlling means 83 controls the input/output of the information input from the terminals 18, 28 through the communication satellite 4, the satellite earth station 5, the network control station 6 and the network 7 via a satellite communication line, the information input from the input operation means 87 of the server 8, and the information output to the display means 86 of the server 8.

The data acquiring/updating means 84 acquires the information input from the terminals 18, 28 and the information input from the input operation means 87 of the server 8, and updates the database in the storage 82 according to necessity. The data acquiring/updating means 84 includes a construction machine information acquiring means 841 for acquiring and updating the information about the construction machine 1 and a service car information acquiring means 842 for acquiring and updating the information about the service car 2.

The construction machine information acquiring means 841 includes a construction machine position information acquiring means 843 that acquires the current position information of the construction machine 1 and a construction machine detailed information acquiring means 844 that acquires the other detailed information of the construction machine 1. The construction machine position information acquiring means 843 acquires the current position information transmitted from the terminal 18 of the construction machine 1 through the network 7, and outputs the acquired information to the storage 82. Further, the construction machine detailed information acquiring means 844 acquires the other information than the current position information of the construction machine 1 stored in the storage area of the communication controller 12 through the network 7, and outputs the acquired information to the storage 82.

Examples of the detailed information acquired by the construction machine detailed information acquiring means 844 include the owner of the construction machine 1, the machine number of the construction machine 1, the total operating time and the like, the information about the construction machine 1 acquired from the state of the driving portion detected by the electronic controller 11, such as the remaining fuel information and the operation information.

The information acquired by the construction machine information acquiring means 841 is accumulated in the construction machine DB 821. The construction machine DB 821 includes a construction machine position information accumulation means 823 for accumulating the current position information of the construction machines 1 and a construction machine detailed information accumulation means 824 for accumulating the other detailed information of the construction machines 1.

Figure 5:
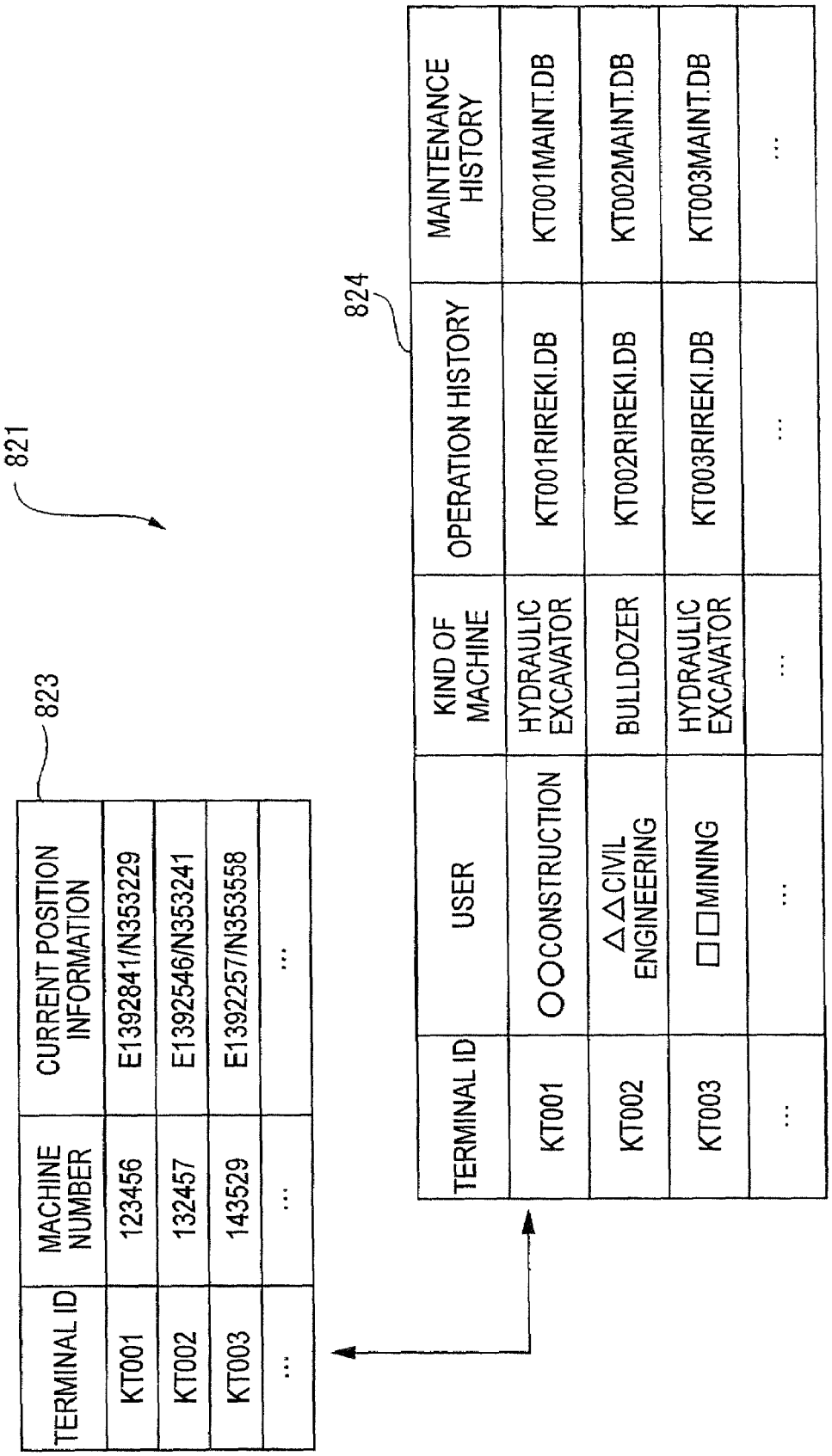
FIG. 5 is a schematic illustration showing a configuration of a construction machine DB according to the first embodiment of the present invention.

As shown in FIG. 5, the construction machine DB 821 is a relational database that includes a construction machine position information accumulation means 823 and a construction machine detailed information accumulation means 824. The terminal ID of the terminal 18 of each construction machine 1, the machine number corresponding to each terminal ID and the current position information are accumulated in the construction machine position information accumulation means 823. Further, the detailed information corresponding to each terminal ID is accumulated in the construction machine detailed information accumulation means 824, the detailed information including owner's name (the user), kind of machine, operation history, maintenance history and the like of each construction machine 1. Incidentally, since the operation history and the maintenance history of each construction machine 1 are respectively entered as a separated database, links of an operation history file and a maintenance history file are pasted to each record. Further, when referring to the operation history and the maintenance history of the construction machine 1 corresponding to the terminal ID, the necessary information can be acquired by referring to the operation history file or the maintenance history file corresponding to the terminal ID.

The service car information acquiring means 842 includes a service car position information acquiring means 845 for acquiring the current position information of the service car 2 and a service car detailed information acquiring means 846 for acquiring the other detailed information of the service car 2. The service car position information acquiring means 845 acquires the current position information transmitted from the terminal 28 of the service car 2 through the network 7, and outputs the acquired information to the storage 82. Further, the service car detailed information acquiring means 846 acquires the other information than the current position information of the service car 2 stored in the storage area of the communication controller 22 through the network 7, and outputs the acquired information to the storage 82.

Examples of the detailed information acquired by the service car detailed information acquiring means 846 include the kind of repairing tools carried by the service car 2, the name and number of replacement parts, the name of a serviceman, the skill of the serviceman, a patrolling route of the service car 2 and the like.

The information acquired by the service car information acquiring means 842 is accumulated in the service car DB 822. The service car DB 822 includes a service car position information accumulation means 825 for accumulating the current position information of each service car 2 and a service car detailed information accumulation means 826 for accumulating the other detailed information of each service car 2.

Figure 6:
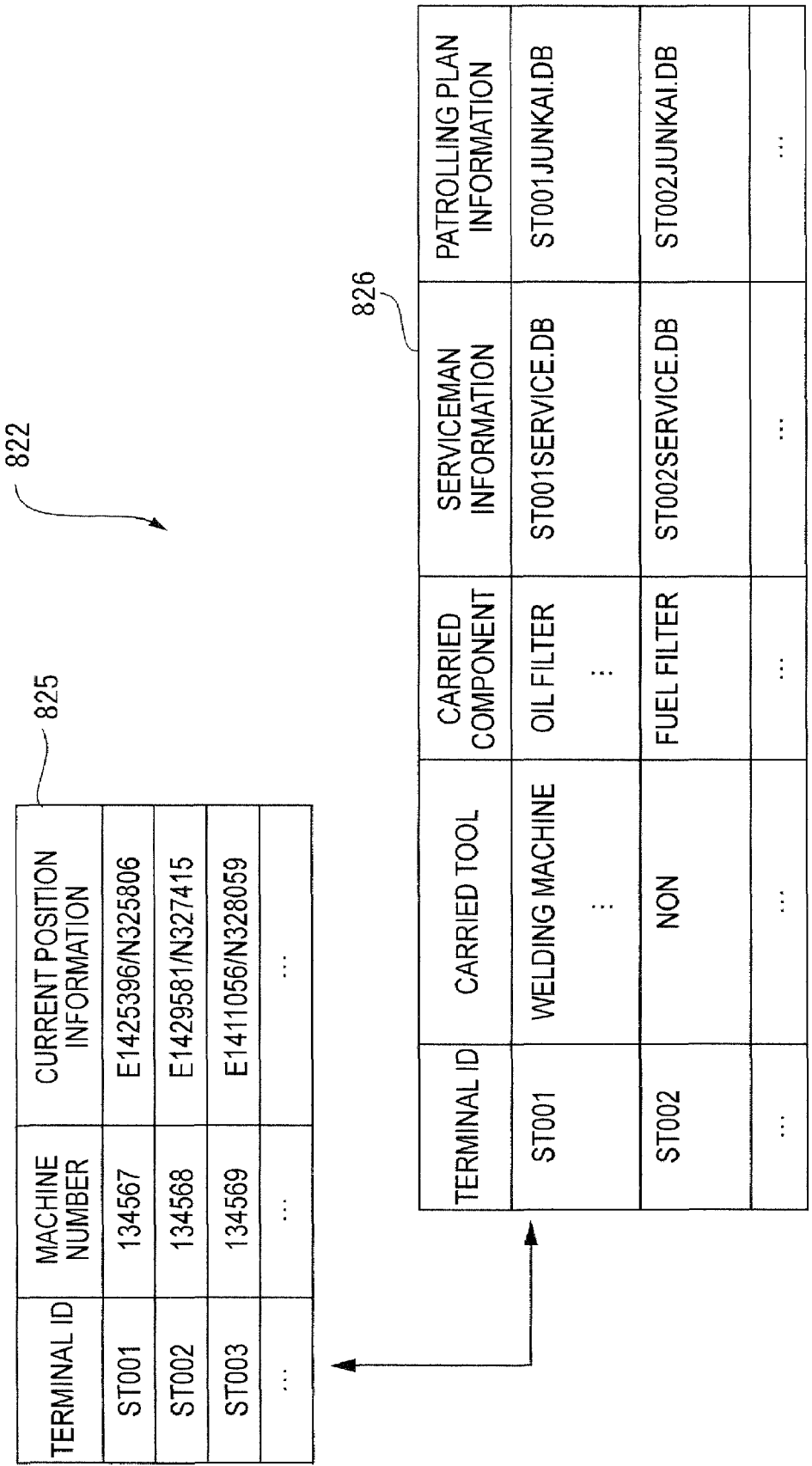
FIG. 6 is a schematic illustration showing a configuration of a service car DB according to the first embodiment of the present invention.

As shown in FIG. 6, the service car DB 822 is a relational database that includes a service car position information accumulation means 825 and a service car detailed information accumulation means 826. The terminal ID of the terminal 28 of each service car 2, the car number (the machine number) corresponding to each terminal ID and the current position information are accumulated in the service car position information accumulation means 825. Further, detailed information is accumulated in the service car detailed information accumulation means 826, the detailed information including the tools and components carried by the service car 2 corresponding to each terminal ID, the serviceman information, the patrolling plan information and the like.

Incidentally, the serviceman information includes the name of the serviceman riding on the service car 2, qualifications held by the serviceman such as a hazardous material handling license. Further, the patrolling plan information of the service car 2 includes the patrolling route along which the service car 2 patrols, the information of the user to be visited and the like. Similar to the operation history and the maintenance history of the construction machine 1, the serviceman information and the patrolling plan information are respectively entered as a separated database, and links of a serviceman information file and a patrolling plan information file are pasted to each record.

Note that the information accumulated in the construction machine detailed information accumulation means 824 and the service car detailed information accumulation means 826 does not have to be respectively transmitted from the construction machine 1 and the service car 2 through the network 7. For example, since the change of the owner, the machine number and the like of each construction machine 1 is small, the information also can be preliminarily stored in the server 8.

The service car search means 85 searches for the service car 2 located within a predetermined range with the current position of a subject construction machine 1, which requires maintenance from the service cars 2, as reference. The service car search means 85 includes a condition acquiring means 851 that acquires further detailed search conditions regarding the service cars 2 located within the predetermined range from the subject construction machine 1, and a narrowing-down means 852 that searches for the service car 2 matched to the detailed search conditions based on the conditions acquired by the condition acquiring means 851. Further, the service car search means 85 includes a re-search means 853 that enlarges the predetermined range and re-searches for the service cars 2 in the case when there is no service car 2 within the predetermined range from the subject construction machine 1.

The service car search means 85 acquires the current position information of the subject construction machine 1 from the construction machine position information accumulation means 823, and searches the service car 2 within a predetermined radius from the current position of the construction machine 1 by referring to the service car position information accumulation means 825. Herein, the predetermined radius is preliminarily set to a distance which allows the service car 2 to arrive at the current position of the construction machine 1 within short time so as to promptly perform maintenance. The predetermined radius can be set to, for example, 20 km.

The condition acquiring means 851 acquires the detailed information on the maintenance required by the subject construction machine 1. The detailed information is acquired, for example, by detecting the detailed information transmitted from the construction machine 1 through the network 7, or by inputting the detailed information from the input operation means 87 of the server 8. Examples of the detailed information include the tools necessary for performing maintenance such as a welding machine, the replacement parts necessary for performing maintenance, the skill of the serviceman and the like.

The narrowing-down means 852 searches for, among candidates for service cars 2 obtained by the service car search means 85 and matched to the conditions, the service car 2 matched to the further detailed search conditions acquired by the condition acquiring means 851.

In the case when there is no service car 2 within the preliminarily set predetermined radius, the service car search means 85 enlarges the predetermined radius and searches for the service car 2 matched to the conditions by referring to the service car position information accumulation means 825. In the present embodiment, the enlarged predetermined radius can be set to be 10 km larger than the initially set predetermined radius. For example, the predetermined radius for the first re-search can be set to 30 km.

The construction machine search means 88 searches for the subject construction machine 1 by searching the construction machines 1 located within the predetermined range with the current position of the service car 2 searched by the service car search means 85 as reference.

The operation of the management system 100 will be described below.

Figure 7:
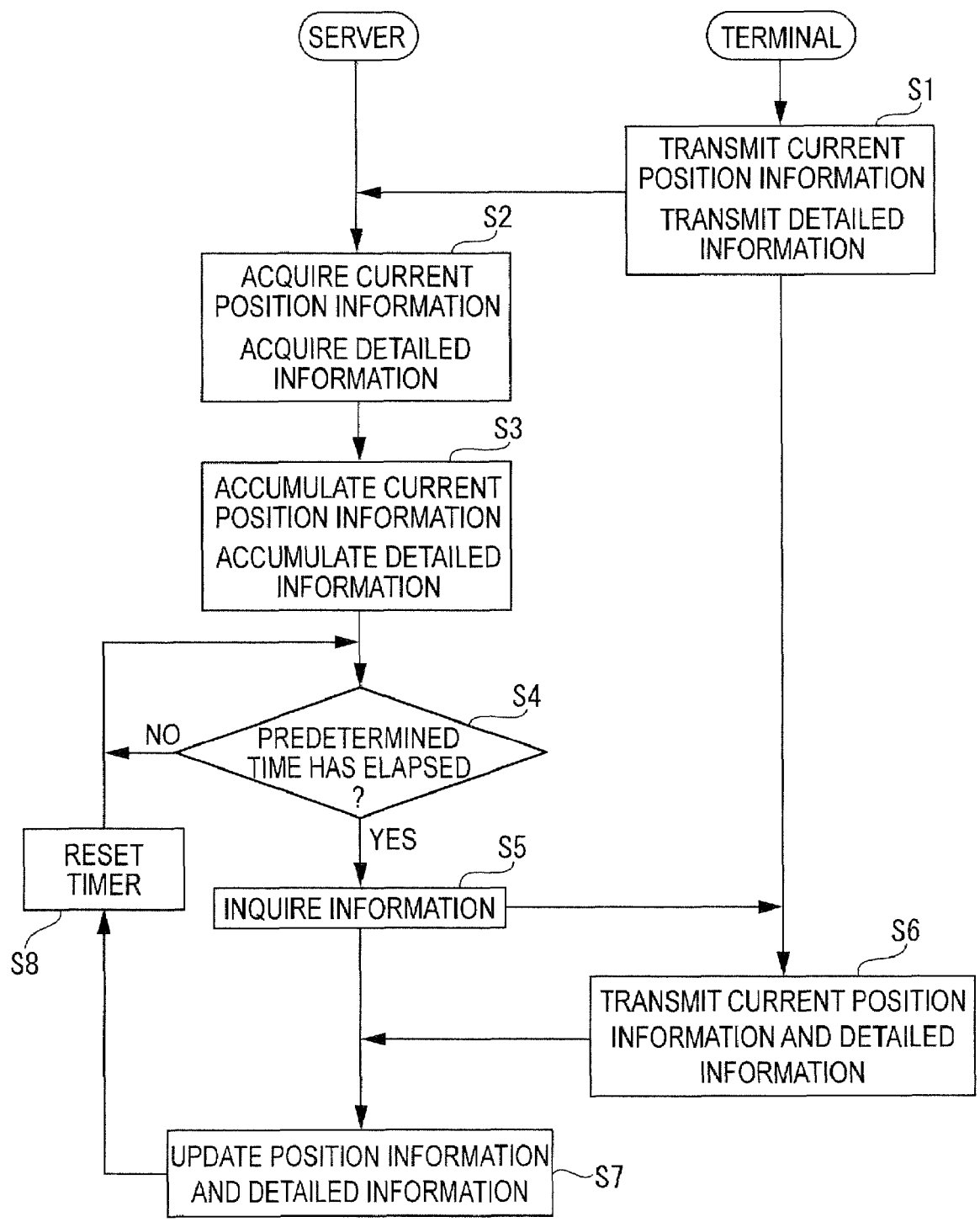
FIG. 7 is a flowchart illustrating operation of the management system according to the first embodiment of the present invention.

FIG. 7 is a flowchart explaining how the current position information and the detailed information of the construction machine 1 and the service car 2 are acquired and accumulated in the storage 82. First, in Step S1, the current position information of each construction machine 1 and the current position information of each service car 2 are respectively transmitted from the terminal 18 of each construction machines 1 and the terminal 28 of each service cars 2. Also transmitted are the detailed information of each construction machine 1 such as the operation state, and the detailed information of each service car 2 such as the tools carried by each service car 2. Next, in Step S2, the construction machine information acquiring means 841 of the server 8 acquires the current position information of each construction machine 1 by the construction machine position information acquiring means 843 and the detailed information of each construction machine 1 by the construction machine detailed information acquiring means 844 through the network 7. On the other hand, the service car information acquiring means 842 of the server 8 acquires the current position information of each service car 2 by the service car position information acquiring means 845 and the detailed information of each service car 2 by the service car detailed information acquiring means 846 through the network 7.

In Step S3, the current position information of each construction machine 1 acquired by the construction machine position information acquiring means 843 is accumulated in the construction machine position information accumulation means 823, and the detailed information of each construction machine 1 acquired by the construction machine detailed information acquiring means 844 is accumulated in the construction machine detailed information accumulation means 824. On the other hand, the current position information of each service car 2 acquired by the service car position information acquiring means 845 is accumulated in the service car position information accumulation means 825, and the detailed information of each service car 2 is accumulated in the service car detailed information accumulation means 826.

In Step S4, the construction machine information acquiring means 841 and the service car information acquiring means 842 of the server 8 count and monitor, by a built-in timer, the elapse of time from the time when the information was previously acquired. When the elapse of time reaches a predetermined period of time (for example, 20 minutes), the information will be inquired respectively to the construction machine 1 and the service car 2 in Step S5. Accordingly, the inquiry of information will be carried out for every predetermined period of time such as 20 minutes.

In Step S6, the terminal 18 of the construction machine 1 and the terminal 28 of the service car 2 respectively transmit updated information to the server 8 in responding to the inquiry from the server 8, the updated information including the construction machine position information, the construction machine detailed information and the service car position information.

In Step S7, the server 8 respectively updates the construction machine DB 821 and the service car DB 822 by the updated information acquired from the terminals 18, 28, so that the updated information is accumulated.

Then, in Step S8, the count value of the elapsed time of the construction machine information acquiring means 841 and the service car information acquiring means 842 is reset, the process moves to Step S4, and the monitoring for elapsed time is started again.

With the above operation, the information transmitted from each construction machine 1 and each service car 2 through the network 7 is accumulated in the storage 82 of the server 8, and is updated for every predetermined period of time.

The operation of the service car search means 85 will be described below.

Figure 8:
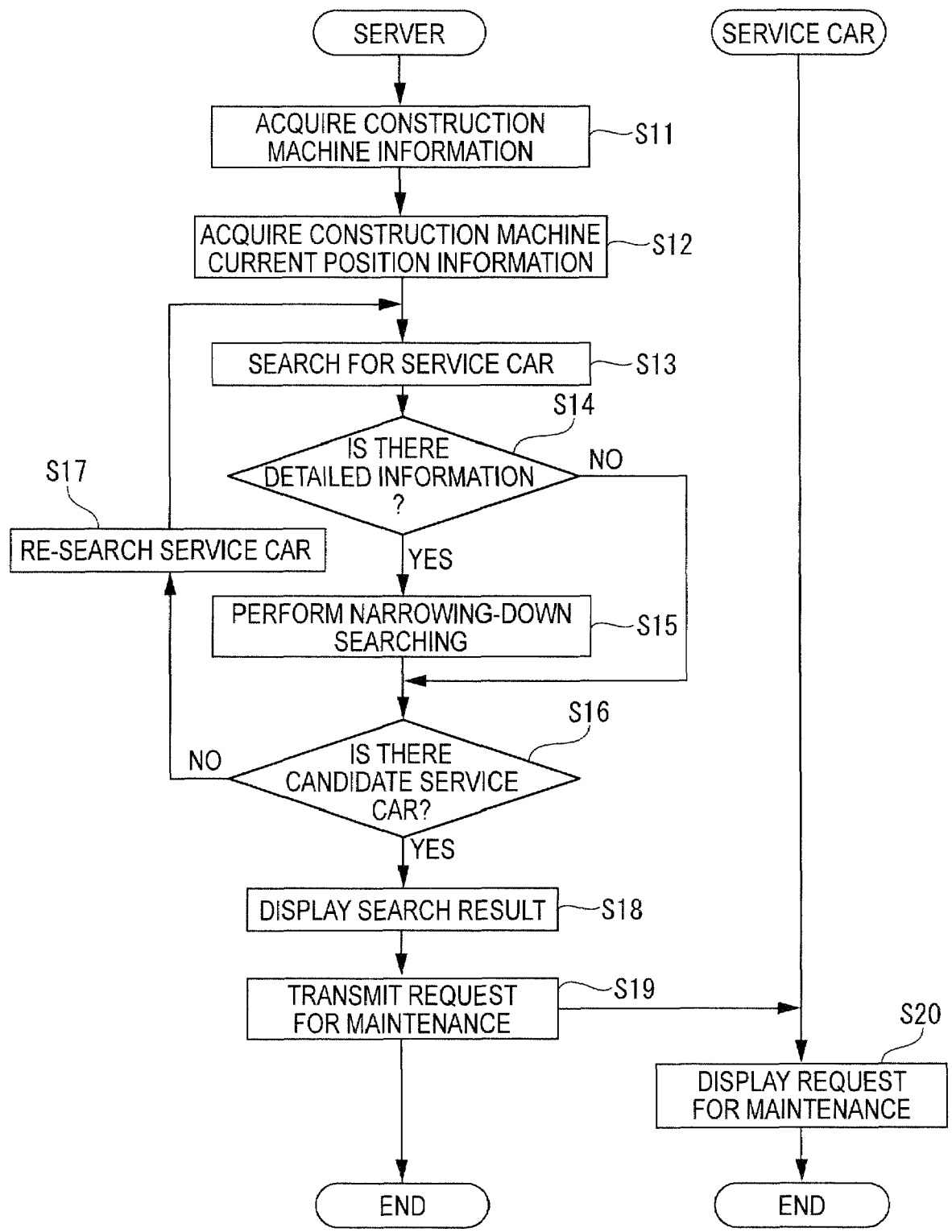
FIG. 8 is another flowchart illustrating the operation of the management system according to the first embodiment of the present invention.

FIG. 8 is a flowchart explaining how the service car 2 matched to the preliminarily set search conditions is searched for the subject construction machine 1 that requires maintenance. In Step 11 of FIG. 8, in responding to the inquiry from a customer by telephone, for example, an operator inputs the terminal ID and the machine number from the input operation means 87 of the server 8, so that construction machine information of the construction machine 1 to be searched is acquired by the server 8, and the construction machine 1 is specified.

Next, in Step S12, the server 8 acquires the current position information of the subject construction machine 1 from the construction machine position information accumulation means 823. Further, in Step S13, based on the current position information of the service car 2 accumulated in the service car position information accumulation means 825, the service car search means 85 calculates the distance between the service car 2 and the subject construction machine 1 to select the service car 2 within the predetermined radius with the current position of the subject construction machine 1 as the center.

When the detailed information is acquired by the condition acquiring means 851 by inputting the further detailed information from the input operation means 87 of the server 8 in Step S14, the narrowing-down means 852 will carry out narrowing-down searching in Step S15. For example, if having repairing tools necessary for the maintenance is entered as a detailed condition, then the narrowing-down means 852 searches, by referring to the service car detailed information accumulation means 826, for the service car 2 having the subject repairing tools among the service cars 2 found in Step S13.

Figure 9:
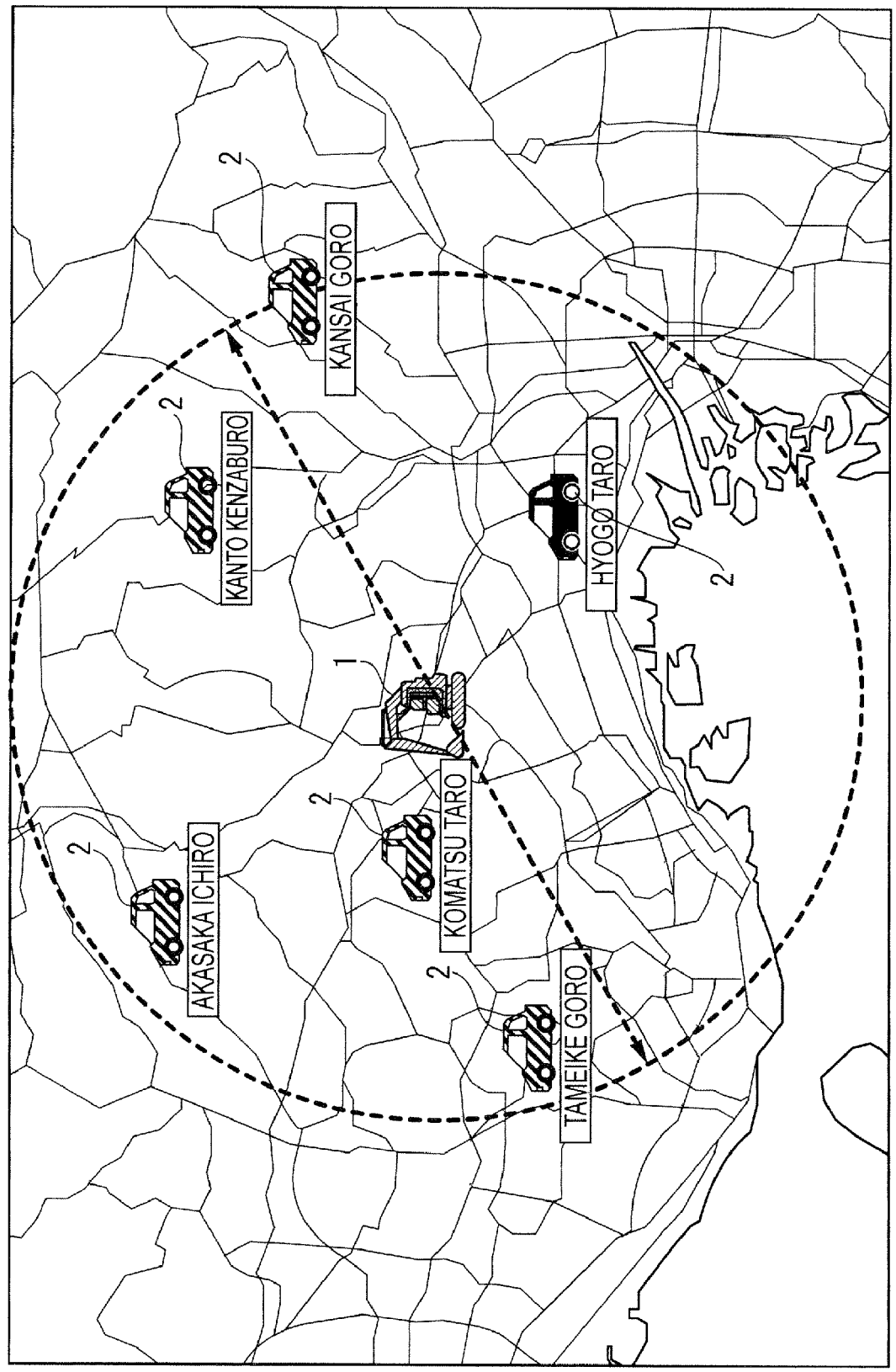
FIG. 9 is an illustration showing a search result of the service car according to the first embodiment of the present invention.

In Step S16, the server 8 determines whether or not there is a service car 2 matched to the search conditions based on the search results of the service car search means 85 and the narrowing-down means 852. In the case where there is a service car 2 matched to the search conditions, the terminal ID, the current position, the detailed information and the like of the candidate service car 2 will be displayed on the display means 86 of the server 8 in Step S18. When there are a plurality of service cars 2 matched to the search conditions, the information of the plurality of service cars 2 will be displayed on the display means 86. Incidentally, there is an alternative arrangement in which, when there are a plurality of service cars 2 matched to the search conditions, only the information of the service car 2 nearest from the subject construction machine 1 is displayed on the display means 86. A display manner of the display means 86 may be as shown in FIG. 9 in which the current position of the service car 2 within a predetermined radius with the subject construction machine 1 as the center, or the current position of the service car 2 within the predetermined radius with the subject construction machine 1 as the center and matched to the detailed search conditions is displayed on the map. Alternatively, the display manner of the display means 86 may also be the one in which an address of the current position of each service car 2 matched to the search conditions, the detailed information and the like are displayed in a table.

Incidentally, when no detailed information is acquired by the condition acquiring means 851 in Step S14, the process will move to Step 16 without performing the narrowing-down searching.

In the case where there are a plurality of service cars 2 matched to the search conditions, when the operator appropriately selects a service car 2 (for example, the nearest service car 2) based on the information displayed on the display means 86, the input/output controlling means 83 of the server 8 transmits a request signal to the service car 2 for requesting maintenance in Step S19. The service car 2 receives the request signal for maintenance and, in Step S20, displays the request information for requesting maintenance in the image display 27 such as a car navigation system. In responding to the display, the service car 2 moves toward the current position of the construction machine 1 to perform necessary maintenance.

In the case where there is no service car 2 matched to the search conditions within the predetermined range in Step S16, the process will move to Step 17 in which the re-search means 853 enlarges the predetermined radius of the service car search means 85 to re-search for the service car 2. Then the process moves to Step 14 to repeat the same process as above.

The operation of the service car 2 when a request for maintenance is displayed on the image display 27 of the service car 2 will be described below.

Figure 10:
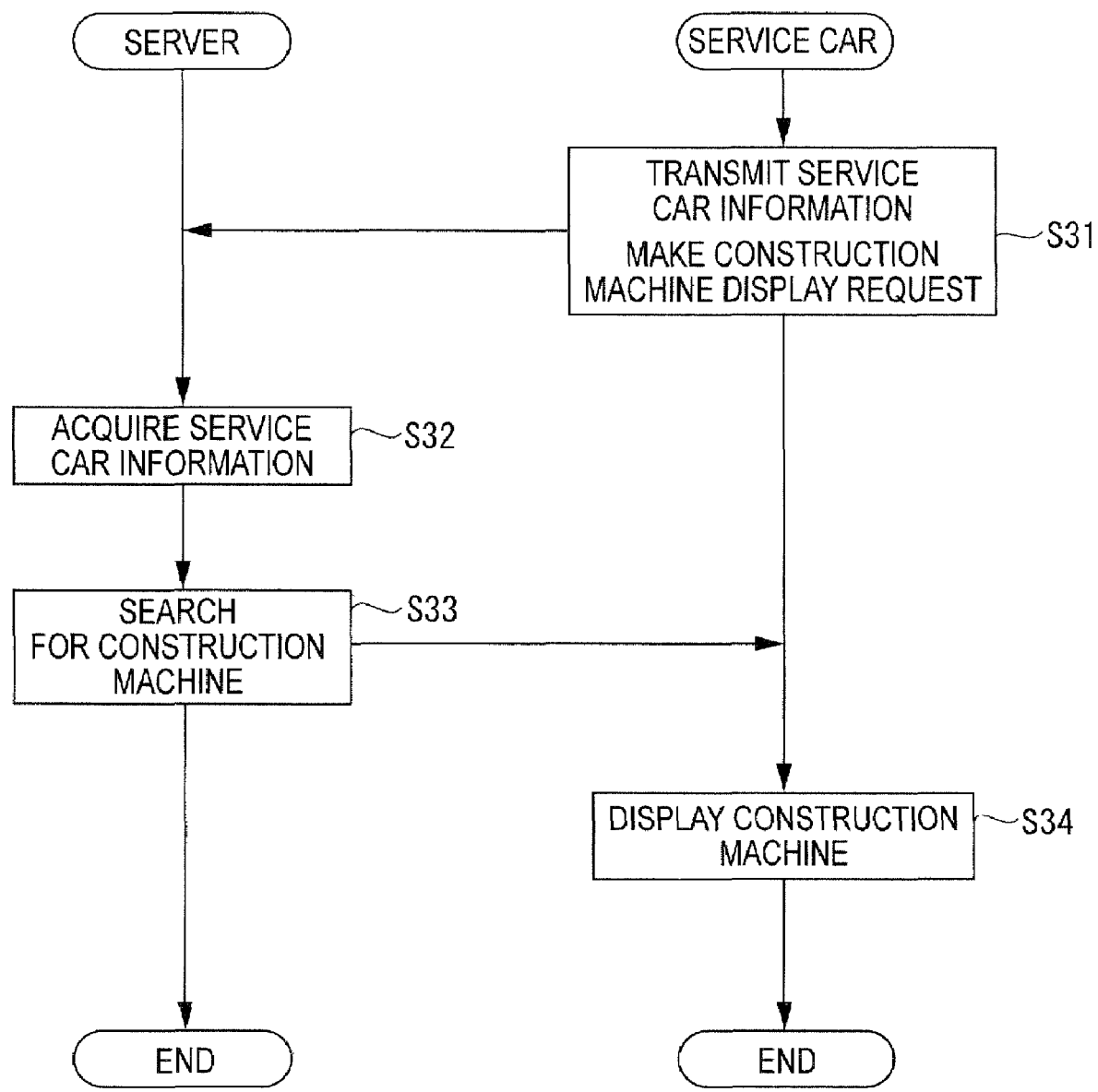
FIG. 10 is another flowchart illustrating the operation of the management system according to the first embodiment of the present invention.

FIG. 10 is a flowchart explaining the operation of the management system 100 for displaying the current position of the subject construction machine 1 on the image display 27 of the service car 2. When the request for maintenance is displayed on the image display 27 of the service car 2 in Step S20 of FIG. 8, in order to display the current position of the construction machine 1 on the image display 27 of the service car 2, the service car 2, in Step S31, transmits the service car information for specifying the service car 2 such as the terminal ID, the machine number and the like to the server 8 through the network 7, and makes a construction machine display request for displaying the current position of the subject construction machine 1.

In the server 8, upon acquiring the service car information transmitted from the service car 2 in Step S32, the construction machine search means 88 searches, in Step S33, for the construction machine 1 within the predetermined range from the current position of the service car 2 based on the service car position information from the service car position information accumulation means 825 and the construction machine position information from the construction machine position information accumulation means 823. It is preferred that the predetermined radius set by the service car search means 85 is treated as an initial setting, and, when the predetermined radius is enlarged by the re-search means 853, the enlarged predetermined radius (predetermined range) is set as a predetermined radius for the construction machine search means 88.

Figure 11:
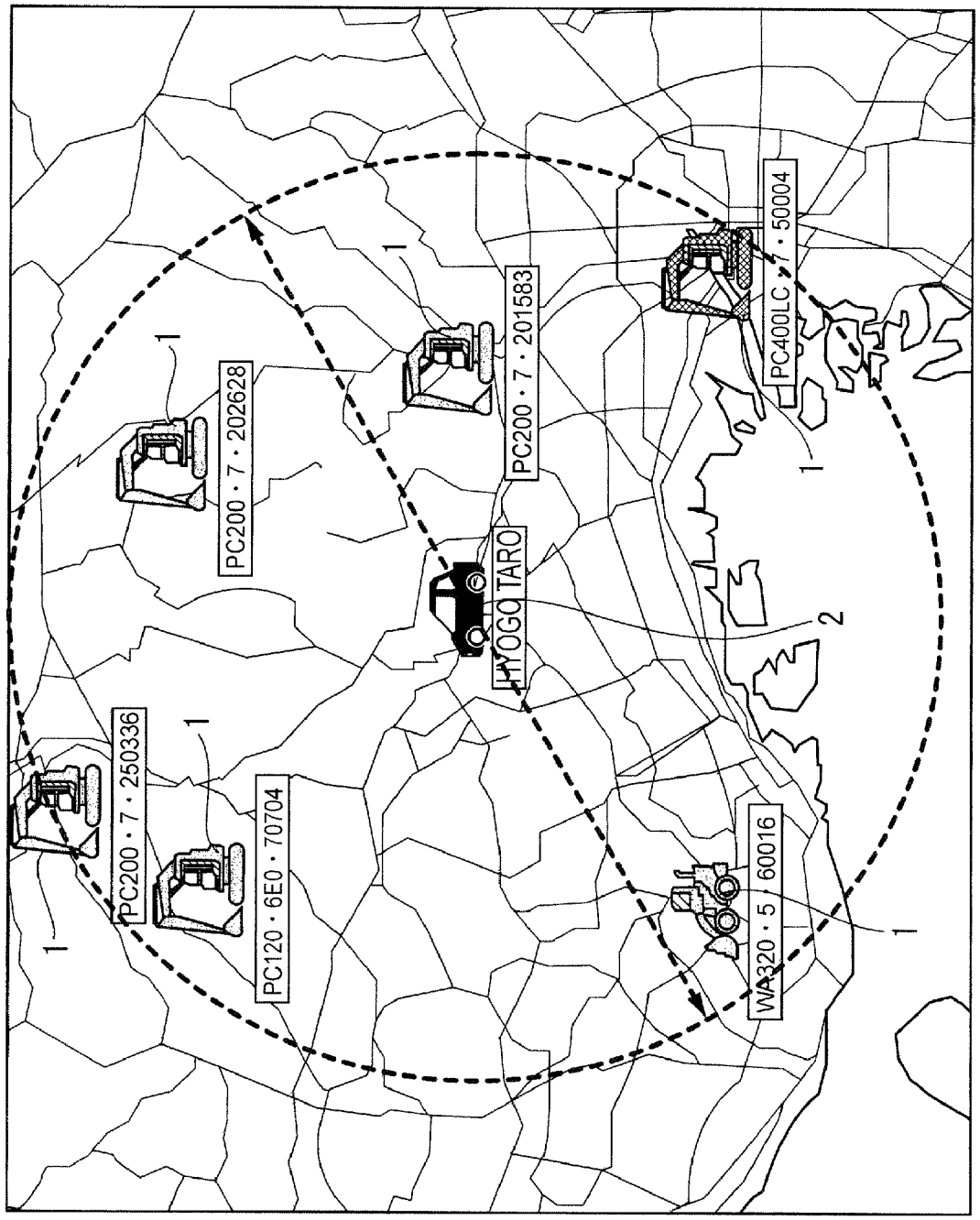
FIG. 11 is an illustration showing a display result of the construction machine according to the first embodiment of the present invention.

The server 8 transmits the construction machine information of the construction machines 1 such as the current positions, the machine numbers and the like searched by the construction machine search means 88 to the service car 2. By the above operation, in Step S34, the construction machine 1 within the predetermined radius with the service car 2 as the center is displayed on the image display 27 of the service car 2 as shown in FIG. 11. Herein, it is preferred that the subject construction machine 1 that requires maintenance is differently displayed compared with the other construction machines 1 (for example, an icon for the subject construction machine 1 has different color from those of the other construction machines 1). Accordingly, the person in the service car 2 can know the current position of the construction machine 1.

Further, the server 8 can transmits the detailed information of the subject construction machine 1 from the construction machine detailed information accumulation means 824 to the service car 2. Accordingly, when performing an operation to, for example, select the subject construction machine 1 on the image display 27, the detailed information of the subject construction machine 1 is transmitted from the server 8, and a failed part, the operation state and the like are displayed on the image display 27 as shown in FIG. 11.

Incidentally, there is an alternative arrangement in which, when the request for maintenance is displayed on the image display of the service car 2 in Step S20, by simultaneously transmitting both the current position information and the detailed information of the construction machine 1 to the service car 2 by the server 8, not only the request for maintenance, but also the current position of the construction machine 1, the detailed information of the construction machine 1 and the current position of the service car 2 are displayed on the image display 27 at the same time. In such a case, the arrangement is not limited to the one in which all construction machines 1 within the predetermined range from the current position of the service car 2 are displayed, but can alternatively be the one in which the current position of the service car 2 and at least the current position of the subject construction machine 1 are displayed.

According to the first embodiment, the following advantages can be achieved.

(1) Due to the provision of the service car search means 85, the service car 2 located within a predetermined range from the subject construction machine 1 can be easily searched out. Accordingly, unlike the conventional art, it is not necessary to search for the service car near the construction machine from the map, and therefore the service car 2 can rapidly move to the construction machine 1, and the construction machine 1 and the service car 2 can be more efficiently managed.

(2) Due to the provision of the condition acquiring means 851 and the narrowing-down means 852, the service cars 2 selected by the service car search means 85 can be narrowed down to find the service car 2 matched to the detailed search conditions acquired by the condition acquiring means 851. Accordingly, a suitable service car 2 can be dispatched according to the kind of the maintenance required by the construction machine 1. Since there are many kinds of construction machines 1 and therefore there will be many kinds of maintenance, there is possibility that some kinds of maintenance may only be performed by special service cars. Since the service car 2 that performs desired maintenance can be searched by the narrowing-down means 852, the present invention is particularly useful in managing the construction machines 1.

(3) Due to the provision of the re-search means 853, if the service car search means 85 finds no service car 2 matched to the search conditions within the predetermined range, it is possible to perform re-search by enlarging the predetermined radius for searching. Accordingly, in the case where a particular tool is necessary for performing maintenance, for example, the high priority will be placed on finding a service car 2 that has the particular tool even if it is located beyond the predetermined range. Accordingly, since the re-search means 853 can perform the search according to the order of priority, the present invention is particularly useful in managing the construction machines 1 in the case where the service cars 2 capable of performing some particular maintenance are limited.

(4) Since the current positions of the construction machine 1 and the service car 2 are detected by using the GPS satellites 3, the current positions can be known simply and precisely. Further, since the current positions of the construction machine 1 and the service car 2 are automatically updated for every predetermined period of time, the reliability of the current position information can be more improved. Further, since it is not necessary for the owner and the serviceman to update the current position, the construction machine 1 and the service car 2 can be simply managed.

(5) Since the construction machine search means 88 searches for the construction machine 1 located within the predetermined range with the current position of the service car 2 as reference, the current position of the subject construction machine 1 can be promptly recognized by the service car 2. Accordingly, the service car 2 can promptly determine a shortest route to arrive at the current position of the construction machine 1 to provide service rapidly. Further, since the detailed information of the subject construction machine 1 can be displayed on the image display 27, the service car 2 can confirm the state of the failed part and the like before starting to the current position of the subject construction machine 1. Accordingly, the service car 2 can prepare components and devices before arriving at the current position of the subject construction machine 1, so that the service can be provided more rapidly.

SECOND EMBODIMENT

A second embodiment of the present invention will be described below. The second embodiment is different from the first embodiment in that the management system 100 can manage the construction machine 1 of the first embodiment even if the construction machine 1 is a terminal-non-equipped vehicle that is not equipped with the terminal 18.

Figure 12:
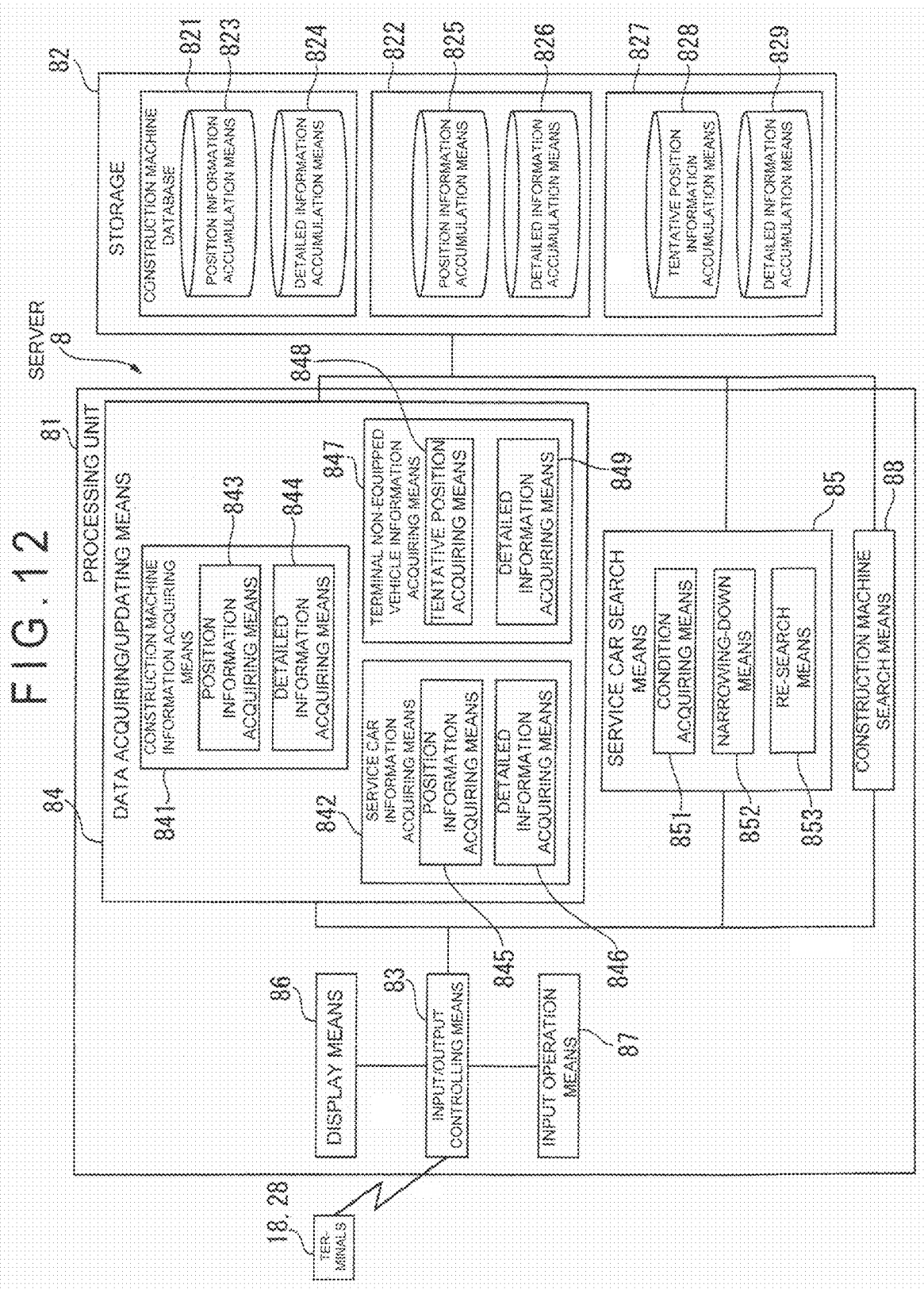
FIG. 12 is a schematic illustration showing a configuration of a server according to a second embodiment of the present invention.

FIG. 12 schematically illustrates a configuration of the server 8 according to the second embodiment of the present invention. As shown in FIG. 12, the data acquiring/updating means 84 of the server 8 includes a terminal-non-equipped vehicle information acquiring means 847 that acquires information about a terminal-non-equipped vehicle 1A that has no terminal (see FIG. 16). Further, the storage 82 includes a terminal-non-equipped vehicle DB 827 that accumulates the information about the terminal-non-equipped vehicle 1A.

The terminal-non-equipped vehicle information acquiring means 847 includes a tentative position information acquiring means 848 that acquires the current position information of the terminal-non-equipped vehicle 1A, and a terminal-non-equipped vehicle detailed information acquiring means 849 that acquires the other information about the terminal-non-equipped vehicle 1A.

The tentative position information acquiring means 848 acquires the current position information of the service car 2 transmitted from the terminal 28 of the service car 2, and recognizes the current position information as the current position of the terminal-non-equipped vehicle 1A. Further, the current position information is accumulated in the terminal-non-equipped vehicle DB 827 as a tentative position of the terminal-non-equipped vehicle 1A.

The terminal-non-equipped vehicle detailed information acquiring means 849 acquires the detailed information about the terminal-non-equipped vehicle 1A and accumulates the acquired detailed information in the terminal-non-equipped vehicle DB 827, the detailed information being either transmitted from the terminal 28 of the service car 2 or input from the input operation means 87 of the server 8. Herein, examples of the detailed information about the terminal-non-equipped vehicle 1A include the owner of the terminal-non-equipped vehicle 1A, the kind of the terminal-non-equipped vehicle 1A and the like.

The terminal-non-equipped vehicle DB 827 includes a tentative position information accumulation means 828 that accumulates the tentative position information of the terminal-non-equipped vehicle 1A acquired by the tentative position information acquiring means 848, and a terminal-non-equipped vehicle detailed information accumulation means 829 that accumulates the detailed information of the terminal-non-equipped vehicle 1A acquired by the terminal-non-equipped vehicle detailed information acquiring means 849.

The operation of the management system 100 having the above configuration will be described below.

Figure 13:
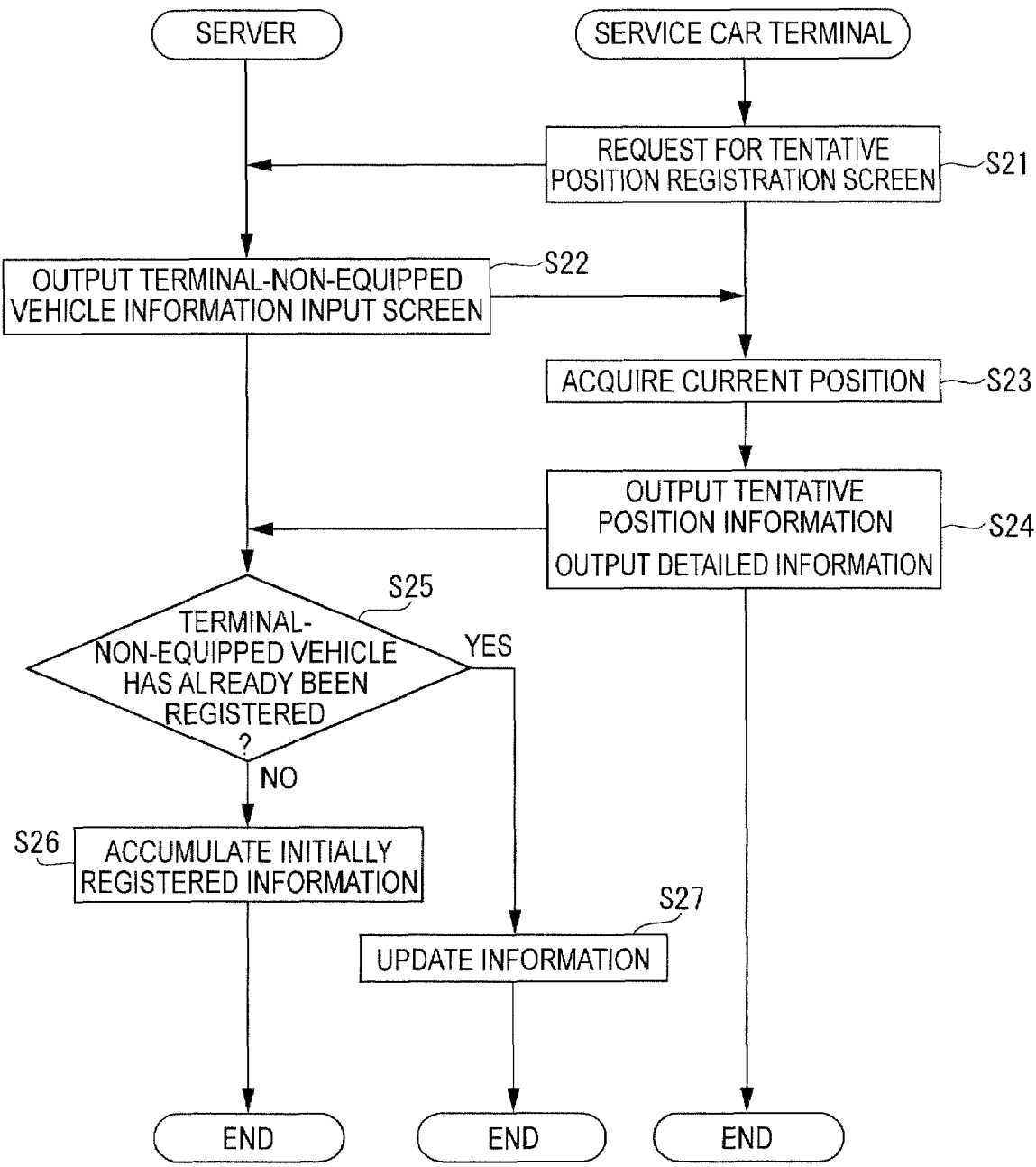
FIG. 13 is a flowchart illustrating operation of a management system according to the second embodiment of the present invention.

FIG. 13 is a flowchart for explaining the operation of the management system 100 according to the second embodiment. First, when the service car 2 finds a terminal-non-equipped vehicle 1A during patrol, or when the service car 2 has arrived, in responding to the request from the customer, at the current position of the terminal-non-equipped vehicle 1A, the service car 2 outputs a request signal for requesting a tentative position registration screen from the terminal 28 of the service car 2 to the server 8 through the network 7.

Figure 14:
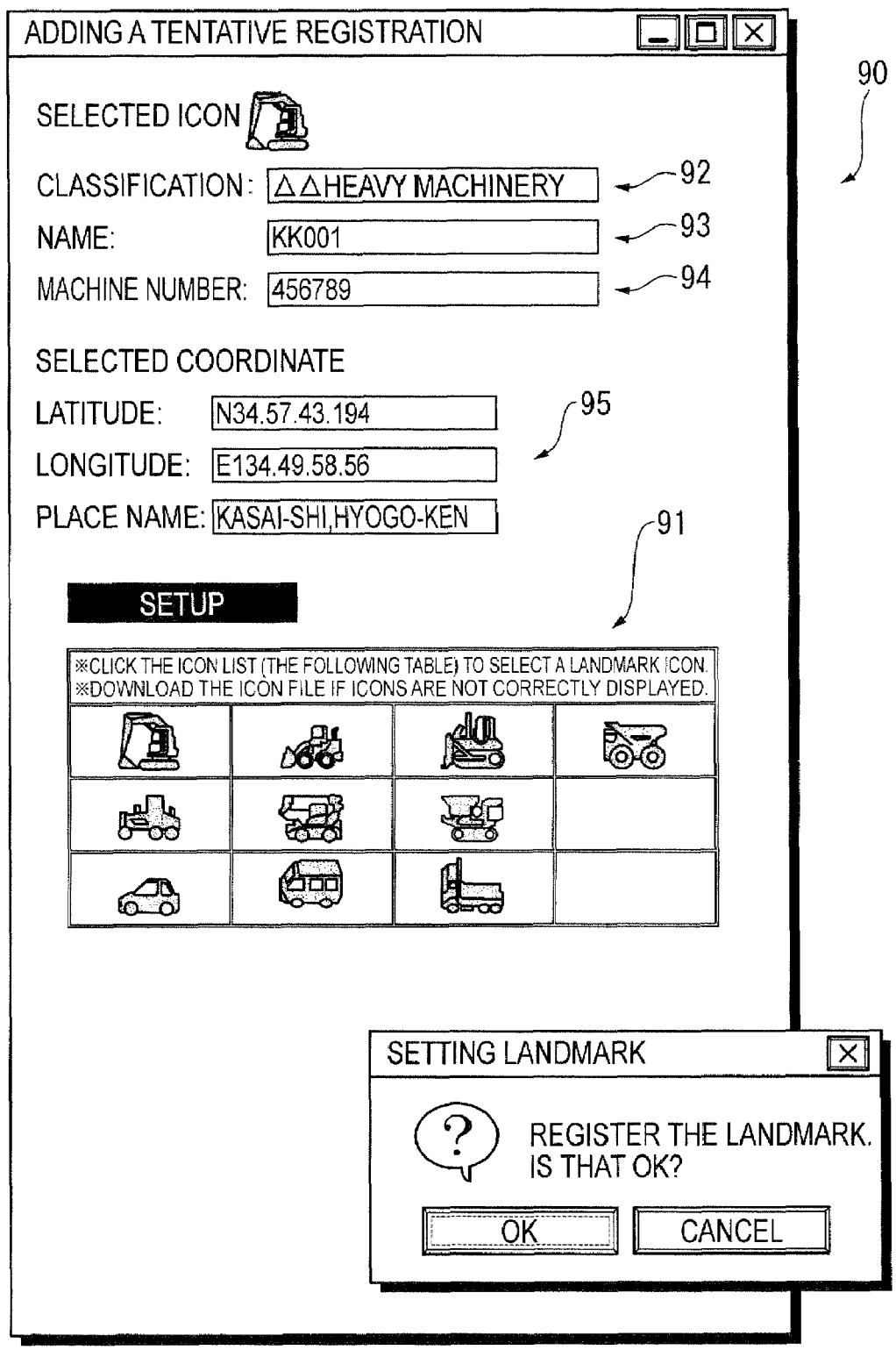
FIG. 14 is an illustration showing an information input screen of a tentative position information acquiring means according to the second embodiment of the present invention.

The server 8 receives the request signal with the input/output controlling means 83 and, in Step S22, transmits an information input screen 90 (as shown in FIG. 14) for the terminal-non-equipped vehicle 1A to the terminal 28. Displayed on the information input screen 90 is detailed information such as an icon selection field 91 for selecting an icon corresponding to the kind of the terminal-non-equipped vehicle 1A, a classification entry field 92, a name entry field 93, a machine number entry field 94 and the like of the terminal-non-equipped vehicle 1A. Also displayed on the information input screen 90 is a tentative position entry field 95 for inputting the current position of the terminal-non-equipped vehicle 1A. In the present embodiment, since the current position of the service car 2 is recognized as the current position of the terminal-non-equipped vehicle 1A, in Step S23, the server 8 acquires the current position information of the service car 2 from the terminal 28 of the service car 2. Accordingly, the current position information of the service car 2 acquired from the terminal 28 is preliminarily input in the tentative position entry field 95.

In Step S24, necessary items are input from the information input screen 90, and the tentative position information and the other detailed information are output to the server 8 from the terminal 28.

In Step S25, the tentative position information acquiring means 848 of the server 8 acquires the tentative position information from the terminal 28 and, by referring to the terminal-non-equipped vehicle DB 827, determines whether or nor the terminal-non-equipped vehicle 1A pertaining to the tentative position registration has already been registered. In the case where the terminal-non-equipped vehicle 1A has not been registered yet, the tentative position information will be initially registered and accumulated in the tentative position information accumulation means 828 in Step S26. While in the case where the terminal-non-equipped vehicle 1A has already been registered, the tentative position information registered in the tentative position information accumulation means 828 will be updated in Step S27.

The detailed information other than the tentative position information is similarly processed. Specifically, in Step S25, the terminal-non-equipped vehicle detailed information acquiring means 849 determines, by referring to the terminal-non-equipped vehicle DB 827, whether or not the detailed information has already registered. In the case where the detailed information has not been registered yet, the detailed information will be initially registered and accumulated in the terminal-non-equipped vehicle detailed information accumulation means 829 in Step S26, while in the case where the detailed information has already been registered, the detailed information will be updated in Step S27. Accordingly, in the case where the detailed information about the terminal-non-equipped vehicle 1A has already been registered, the tentative position information acquiring means 848 also serves as a tentative position information updating means for updating the tentative position information.

Figure 15:
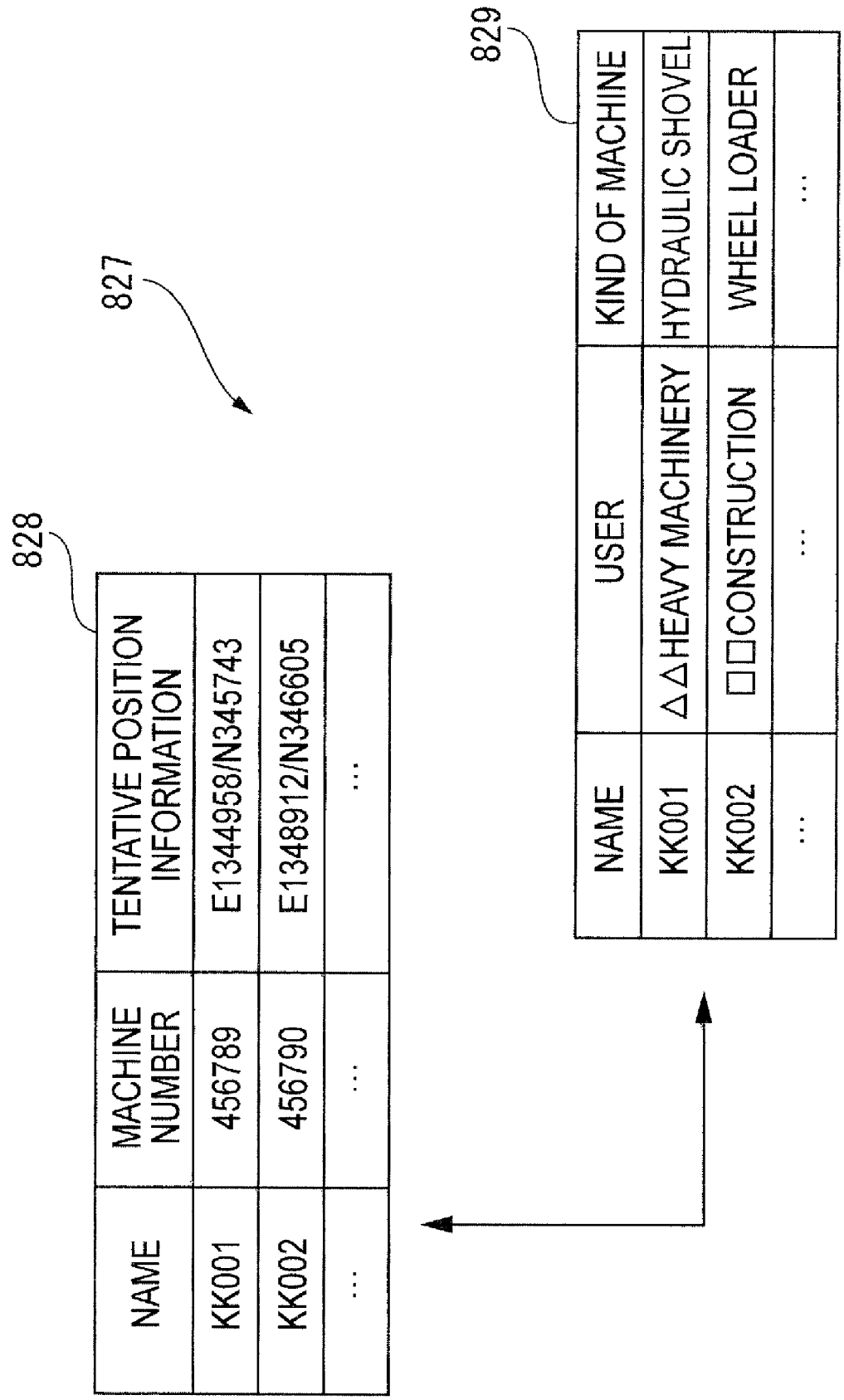
FIG. 15 is a schematic illustration showing a configuration of a terminal-non-equipped vehicle DB according to the second embodiment of the present invention.

The tentative position information and the detailed information accumulated by the above operation are respectively accumulated in the tentative position information accumulation means 828 and the terminal-non-equipped vehicle detailed information accumulation means 829. As shown in FIG. 15, the terminal-non-equipped vehicle DB 827 is a relational database that includes the tentative position information accumulation means 828 and the terminal-non-equipped vehicle detailed information accumulation means 829. The name input on the information input screen 90, the machine number and the tentative position information corresponding to the name are accumulated in the tentative position information accumulation means 828. Further, detailed information such as owner's names, kind of the construction machine and the like corresponding to each name are accumulated in the terminal-non-equipped vehicle detailed information accumulation means 829.

Figure 16:
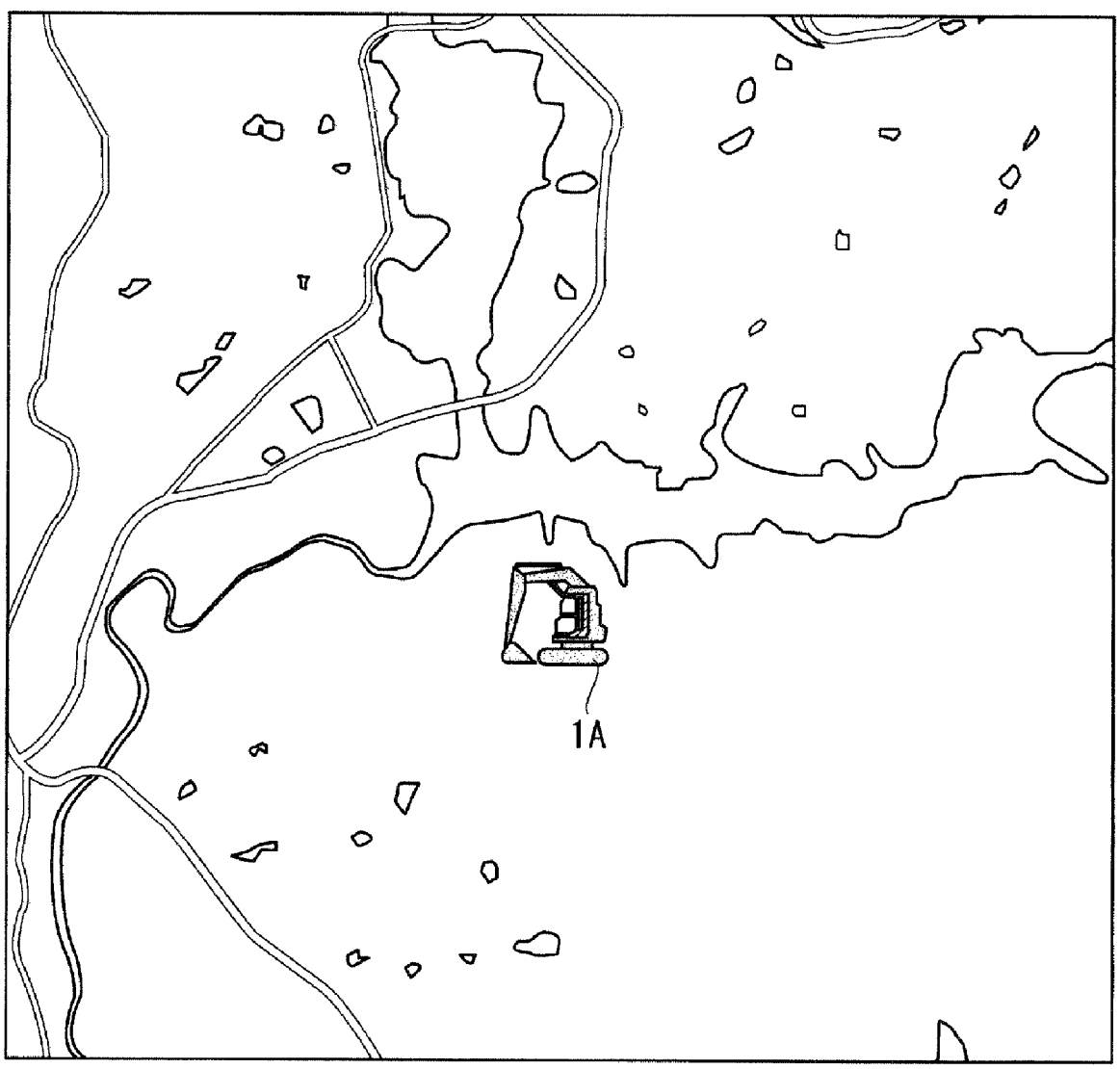
FIG. 16 is an illustration showing a tentative position of the terminal-non-equipped vehicle according to the second embodiment of the present invention.

An icon of a terminal-non-equipped vehicle 1A whose tentative position information is accumulated in the above manner is displayed at the tentative position of a map on the image display 27 of the service car 2 and the display means 86 of the server 8 as shown in FIG. 16. In order to discriminate the terminal-non-equipped vehicle 1A from the others, it is preferred that icon of the terminal-non-equipped vehicle 1A be different in color and shape from the construction machine 1 having the terminal 18, so that a difference is clear between FIG. 9 and FIG. 16.

Figure 17:
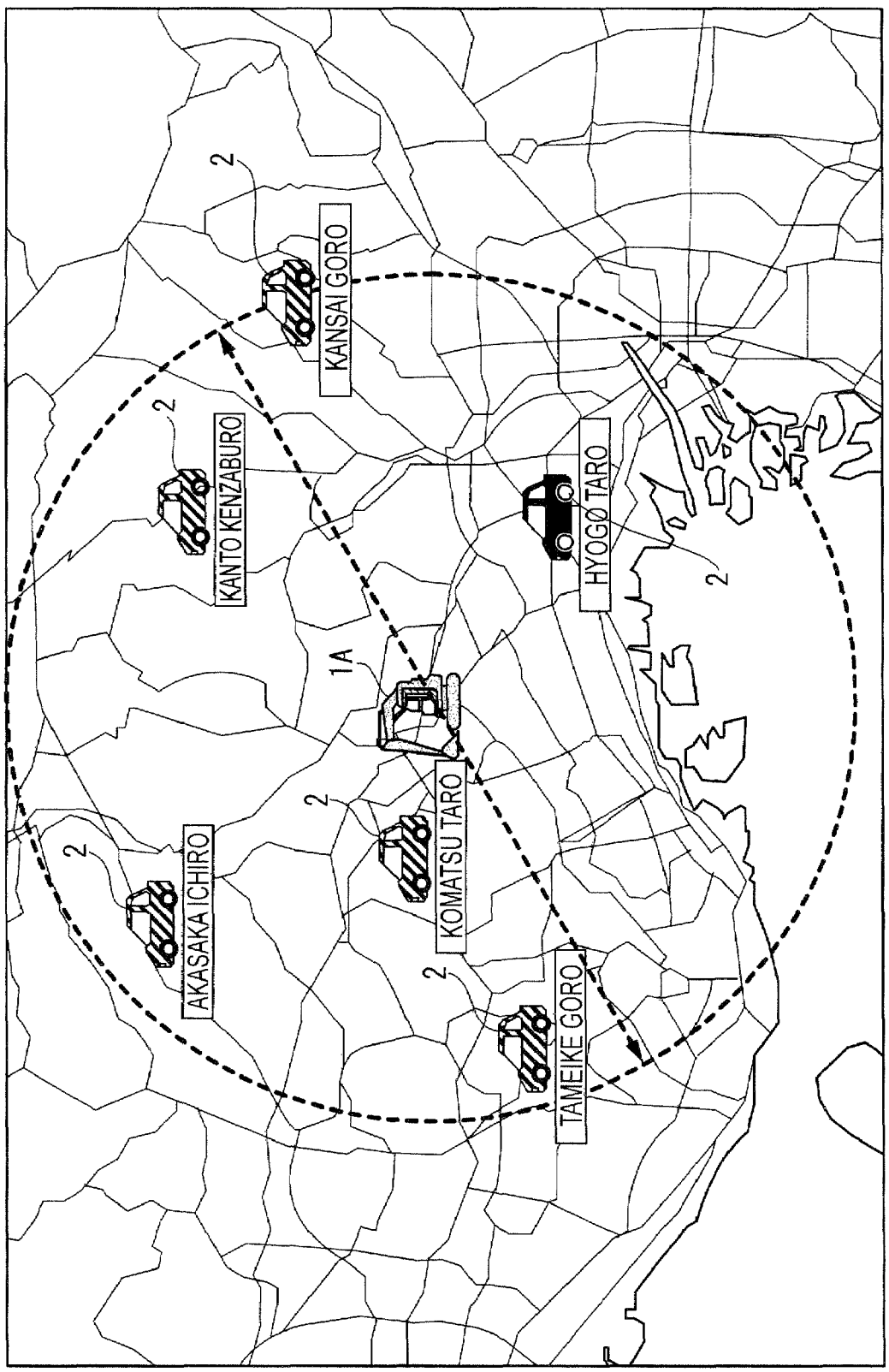
FIG. 17 is an illustration showing a search result of a service car according to the second embodiment of the present invention.

To search for a service car 2 with the terminal-non-equipped vehicle 1A as reference, the service car search means 85 selects, by referring to the tentative position information accumulation means 828 and the service car position information accumulation means 825, the service car 2 within the predetermined radius with the subject terminal-non-equipped vehicle 1A as the center. Further, when the detailed condition is set, similar to the first embodiment, the narrowing-down means 852 performs the narrowing-down searching. When there is no service car 2 within the predetermined radius, the re-search means 853 enlarges the predetermined radius and performs a re-search. As shown in FIG. 17, as the search result, the icon of the terminal-non-equipped vehicle 1A different (in color in the present embodiment) from that of the construction machine 1 and the icons of the service cars 2 within the predetermined radius with the terminal-non-equipped vehicle 1A as the center are displayed on a map displayed on the display means 86 of the server 8 and the like.

According to the second embodiment, the following advantages can be achieved in addition to the advantages (1) to (5) of the first embodiment.

(6) Due to the provision of the terminal-non-equipped vehicle information acquiring means 847, even if the construction machine has no terminal, the position information of the terminal-non-equipped vehicle 1A can be accumulated by performing the tentative position registration. Accordingly, similar to the construction machine 1 having the terminal 18, the service car 2 within the predetermined range with current position of the subject terminal-non-equipped vehicle 1A as reference can be searched by the service car search means 85. Accordingly, since the management system 100 for the construction machine 1 having the terminal 18 can also be applied to the terminal-non-equipped vehicle 1A, the management of the construction machine 1 can be more improved.

(7) Since the current position of the service car 2 is registered as the tentative position, the work for inputting the tentative position information from a tentative position information inputting screen is omitted. Further, since the current position information of the service car 2 is measured by the GPS sensor 23 and therefore the current position of the service car 2 can be precisely measured, the tentative position of the terminal-non-equipped vehicle 1A can be precisely registered. Accordingly, the reliability of the management system 100 can be improved.

(8) Upon receiving the information of the terminal-non-equipped vehicle 1A, the server 8 determines whether or not the information has been registered, and if the information has already been registered, the old information will be updated. Accordingly, since the tentative position information is checked and updated every time when the information is transmitted from the terminal 28 of the service car 2, the latest information is constantly accumulated in the tentative position information accumulation means 828 and the terminal-non-equipped vehicle detailed information accumulation means 829. Accordingly, the reliability of the information of the management system 100 can be improved.

It is to be understood that the present invention is not limited to the embodiments described above, and various modifications and improvements can be made as long as an object of the present invention can be achieved.

The communication method between the moving machine and the server is not limited to satellite communication, but can be others, such as by means of ground wave, as long as the method allows data to be transmitted and received between remote locations.

The arrangement is not limited to the one in which the current position information of the construction machine is accumulated in the construction machine position information accumulation means of the server, but may be the one in which, for example, the current position information of the subject construction machine is acquired when the service car search means searches for the service car.

The arrangement is not limited to the one in which the subject construction machine is specified from the input operation means of the server and the search result is displayed on the display means of the server, but may be the one in which, for example, a terminal of the user is connected through the network, and the input operation and the result display are performed respectively with the input operation means and the display means of the terminal of the user. Further, the input operation and the search result display also can be performed respectively with the input operation means and the display means of the subject construction machine.

The condition acquiring means and the narrowing-down means do not have to be provided. For example, the management system may only search, by the service car search means, for the service car within the predetermined range.

Further, the arrangement is not limited to the one in which the re-search means performs a re-search after the narrowing-down means has performed narrowing-down searching, but may be the one in which, for example, the re-search means enlarges the predetermined range to perform the re-search first and then, in the case where there are service cars within the enlarged predetermined range, performs the narrowing-down searching to narrow the service cars with the detailed condition. Further, the re-search means does not have to be provided. For example, if the predetermined range for the service car search means is set large enough, the service car matched to the search conditions can be selected without providing the re-search means.

There is another alternative arrangement in which a plurality of servers are provided, each of which manages a predetermined area or predetermined service cars. In such a case, the arrangement may be the one in which the service car search means searches for the service car from the position information accumulated in the construction machine position information accumulation means and the service car position information accumulation means of the server. In the case where there is no service car matched to the search conditions within the range stored inside the server, the server inquires to another server (for example, a server managing adjacent area), so that the service car can be searched with the service car search means of the another server by transmitting and receiving information with the another server through a communication line. With such an arrangement, the search can be performed in wider range.

According to the present embodiments, the tentative position information and the detailed information about the terminal-non-equipped vehicle having no terminal is updated every time new information is transmitted. However, when the information is not updated for long time, the reliability of the tentative position information and detailed information will be reduced. To prevent this problem from occurring, there can be provided, for example, a deletion function for deleting the accumulated tentative position information and/or detailed information if the information has not been updated for long time.

The tentative position information of the terminal-non-equipped vehicle does not have to be transmitted from the terminal of the service car, but can be transmitted by the serviceman of the service car with communication equipment such as a mobile phone. Further, the tentative position information not only can be input from the terminal of the service car through the communication line, but also can be directly input from the input operation means of the server. Further, regarding the tentative position information, the arrangement does not have to be the one in which the current position of the service car is recognized as the current position of the terminal-non-equipped vehicle and the current position (tentative position) is automatically detected, but can be the one in which the tentative position is directly selected from the map displayed on the image display of the service car, or the tentative position is specified by inputting an address in the terminal of the service car.

When the service car search means has the narrowing-down means and the re-search means, a priority level setting function may be provided, in which a condition to be used in a search with a higher priority than other condition can be set. For example, the condition of the service car having a specified tool can be set to have higher priority than the condition of the service car being located within the predetermined range.

Also, a moving/stopping judging function can be provided to judge whether the service car is moving or is performing maintenance on the construction machine. In this case, the arrangement can be the one in which, for example, if the current position information is not updated for a predetermined elapse of time, the moving/stopping judging function judges that service car is performing maintenance.

Also, though the preferred configurations, methods and the like for carrying out the present invention are described above, the present invention is not intended to be limited thereto. In other words, though the present invention is mainly illustrated and described based on specific embodiment thereof, it should be understood that various changes in the shape, material, quantity, and other details of construction can be made by those skilled in the art based on the embodiment described above without departing from the spirit and objects of technical characteristics of the present invention.

Accordingly, the description disclosed above, which gives specific shape, material and the like, is just an exemplary description to make the present invention well understood instead of being a definition of the limits of the invention, therefore the description based on a component name without part or all of the specific shape, material and the like is included in the present invention.

INDUSTRIAL APPLICABILITY

The present invention can be applied to a management system for service cars that provides maintenance service to a plurality of construction machines and a management system for a plurality of construction machines.

The invention claimed is:

1. A management system for moving machines that include construction machines and service cars for performing maintenance on the construction machines, the management system comprising:
    terminals mounted in the construction machines and in the service cars; and
    a server connected with the terminals through a communication line to manage the moving machines,
    wherein the server includes:
        construction machine position information acquiring means for acquiring current position information of the construction machines from the terminals of the construction machines;
        construction machine detailed information accumulation means for accumulating detailed information about the construction machines provided by the terminals of the construction machines;
        service car position information acquiring means for acquiring current position information about the service cars from the terminals of the service cars;
        service car detailed information accumulation means for accumulating detailed information about the service cars, the detailed information about the service cars including repairing tools and components carried by the service car for use in maintaining the construction machines; and
        service car search means for selecting the service car located within a predetermined range of a current position of a subject construction machine as reference, based on the current position information about the construction machines acquired by the construction machine position information acquiring means and the current position information about the service cars acquired by the service car position information acquiring means, and
    wherein the service car search means includes:
        condition acquiring means for acquiring a detailed condition necessary for performing maintenance on the subject construction machine; and
        narrowing-down means for selecting, among service cars located within the predetermined range of the current position of the subject construction machine as reference, a service car matching the detailed condition acquired by the condition acquiring means based on the detailed information accumulated in the service car detailed information accumulation means; and
    wherein the server transmits detailed information about the subject construction machine, including the detailed information accumulated in the construction machine detailed information accumulation means, to the service car selected by the service car search means.

2. The management system for moving machines according to claim 1, wherein:
    the service car search means includes re-search means for enlarging the predetermined range and then performing a re-search for one of the service cars in the enlarged predetermined range when no service car in the initial predetermined range is found that matches the detailed condition.

3. A management system for moving machines that include construction machines without terminals and service cars for performing maintenance on the construction machines, the management system comprising:

a server that manages the moving machines through a communication line, and a terminal in each of the service cars, and wherein the server includes:

tentative position information accumulation means for accumulating position information about the construction machines as tentative position information about the construction machines, the tentative position information about the construction machines being acquired either through the communication line or through an input operation means of the server;

terminal-non-equipped vehicle detailed information accumulation means for accumulating detailed information about the construction machines acquired either through the communication line or through the input operation means;

service car position information acquiring means for acquiring current position information about the service cars from the terminals of the service cars;

service car detailed information accumulation means for accumulating detailed information about the service cars, the detailed information about the service cars including repairing tools and components carried by the service car for use in maintaining the construction machines; and service car search means for selecting the service car located within a predetermined range of a tentative current position of a subject construction machine as reference, based on the tentative position information accumulated in the tentative position information accumulation means and the current position information about the service cars acquired by the service car position information acquiring means, and wherein the service car search means includes:

condition acquiring means for acquiring a detailed condition necessary for performing maintenance on the subject construction machine; and narrowing-down means for selecting, among the service cars located within the predetermined range of the tentative current position of the subject construction machine as reference, a service car matching the detailed condition acquired by the condition acquiring means based on the detailed information accumulated in the service car detailed information accumulation means; and wherein the server transmits detailed information about the subject construction machine, including the detailed information accumulated in the terminal-non-equipped vehicle detailed information accumulation means, to the service car selected by the service car search means.

4. The management system for moving machines according to claim 3, wherein:

the server further includes tentative position information updating means for acquiring the tentative position information and updating information in the tentative position information accumulation means with the acquired tentative position information.

5. The management system for moving machines according to claim 3, wherein:

the tentative position information is acquired from the terminal of the service car, and the server recognizes a current position of the service car transmitted from the terminal of the service car as the tentative position information about the construction machine.

* * * * *